United States Patent
Biegert et al.

(10) Patent No.: US 8,401,387 B2
(45) Date of Patent: Mar. 19, 2013

(54) OPTICAL NETWORK INTERFACE DEVICES AND METHODS

(75) Inventors: Mark R. Biegert, Maple Grove, MN (US); Mark T. Paulsen, Excelsior, MN (US)

(73) Assignee: Calix, Inc., Petaluma, CA (US)

( * ) Notice: Subject to any disclaimer, the term of this patent is extended or adjusted under 35 U.S.C. 154(b) by 620 days.

(21) Appl. No.: 12/121,243

(22) Filed: May 15, 2008

(65) Prior Publication Data

US 2009/0060530 A1 Mar. 5, 2009

Related U.S. Application Data

(60) Provisional application No. 60/969,005, filed on Aug. 30, 2007.

(51) Int. Cl.
*H04B 10/00* (2006.01)

(52) U.S. Cl. ............... 398/72; 398/71; 398/66; 398/117

(58) Field of Classification Search ............. 398/66–72, 398/117
See application file for complete search history.

(56) References Cited

U.S. PATENT DOCUMENTS

| | | | |
|---|---|---|---|
| 7,076,177 B1 | 7/2006 | Yang et al. | |
| 7,146,104 B2 * | 12/2006 | Farmer | 398/72 |
| 7,197,244 B2 | 3/2007 | Thomas et al. | |
| 7,243,182 B2 | 7/2007 | Jensen et al. | |
| 7,609,967 B2 | 10/2009 | Hochbaum et al. | |
| 7,649,910 B1 | 1/2010 | Wechsler et al. | |
| 7,672,591 B2 * | 3/2010 | Soto et al. | 398/72 |
| 7,672,596 B2 | 3/2010 | Irie | |
| 7,852,880 B2 | 12/2010 | Solomon et al. | |
| 7,929,694 B2 | 4/2011 | Ahmed | |
| 7,941,055 B2 | 5/2011 | Huang et al. | |
| 2002/0136232 A1 | 9/2002 | Dudziak et al. | |
| 2004/0052274 A1 | 3/2004 | Wang et al. | |
| 2004/0247316 A1 | 12/2004 | Soto et al. | |
| 2006/0133809 A1 | 6/2006 | Chow et al. | |
| 2006/0153222 A1 | 7/2006 | Van Caenegem et al. | |
| 2006/0275036 A1 | 12/2006 | Hochbaum et al. | |
| 2007/0073508 A1 | 3/2007 | Taniguchi et al. | |
| 2008/0310842 A1 * | 12/2008 | Skrobko | 398/72 |
| 2009/0060530 A1 * | 3/2009 | Biegert et al. | 398/214 |
| 2009/0060531 A1 | 3/2009 | Biegert et al. | |

OTHER PUBLICATIONS

"Series G: Transmission Systems and Media, Digital Systems and Networks", ITU-T Recommendation G.984.1, Mar. 2003, 22 pages.
"Series G: Transmission Systems and Media, Digital Systems and Networks", ITU-T Recommendation G.984.2, Mar. 2003, 38 pages.
IEEE Standard for Information technology—Telecommunications and information exchange between systems—Local and metropolitan area networks—Specific requirements, IEEE St. 802.3, 2005, 628 pages.
TXP Power Point Presentation, 10 pages, Sep. 14, 2007 (downloaded on Sep. 12, 2008) www.txpcorporation.com.

(Continued)

*Primary Examiner* — Agustin Bello
(74) *Attorney, Agent, or Firm* — Schumaker & Sieffert, P.A.

(57) ABSTRACT

A system comprises an optical network terminal (ONT) that provides an interface to a passive optical network (PON). The ONT is coupled to a subscriber gateway device via at least one cable. The ONT may be located outside a subscriber premises while the subscriber gateway device may be located within the subscriber premises. The ONT converts optical signals received from PON to electrical signals and transmits the electrical signals to the subscriber gateway device without performing any MAC layer functions. The subscriber gateway device includes an optical media access control (MAC) unit that converts the electrical signals into MAC layer signals and a gateway unit that distributes the MAC layer signals to one or more subscriber devices. In this manner the MAC and gateway layer functions are relocated from the ONT to the subscriber gateway device.

57 Claims, 16 Drawing Sheets

OTHER PUBLICATIONS

Office action for U.S. Appl. No. 12/121,283, mailed Aug. 10, 2011, 10 pages.
Response to office action for U.S. Appl. No. 12/121,283, filed Dec. 12, 2011, 19 pages.
Final office action for U.S. Appl. No. 12/121,283, mailed Dec. 30, 2011, 13 pages.
Response to office action for U.S. Appl. No. 12/121,283, filed Mar. 28, 2012, 18 pages.
Final Office Action for U.S. Appl. No. 12/121,283, mailed Jun. 4, 2012, 13 pages.
Response to final office action for U.S. Appl. No. 12/121,283, filed Aug. 3, 2012, 22 pages.

* cited by examiner

OPTICAL NETWORK INTERFACE DEVICES AND METHODS

This application claims the benefit of U.S. Provisional Application No. 60/969,005, filed Aug. 30, 2007, the entire content of which is incorporated herein by reference.

TECHNICAL FIELD

This disclosure relates to optical networks and, more particularly, network interface devices for optical networks.

BACKGROUND

Optical networks are used to deliver voice, data and video services to multiple network subscribers using one or more optical fibers. The optical networks deployed to deliver the voice, data and video services may be either passive or active. In a passive optical network (PON), for example, passive optical splitters and combiners enable multiple subscribers to share the same optical fiber. Thus, the PON functions as a point-to-multipoint optical network. A PON may conform to any of a variety of PON standards, such as broadband PON (BPON) (ITU G.983), gigabit-capable PON (GPON) (ITU G.984), or gigabit-capable Ethernet PON (GEPON) (IEEE 802.3). In an active optical network, some sort of electrically powered equipment, such as a switch, router, or multiplexer, distributes the signal to the subscriber to which the signal is destined. Thus, an active optical network, such as an active Ethernet optical network, operates as a point-to-point network.

When optical fiber extends to a premise where one or more subscriber devices are located, the service is commonly referred to as Fiber to the Premises (FTTP) or Fiber to the Home (FTTH). In FTTP/FTTH services, an optical network terminal (ONT) terminates an optical fiber of the optical network, and delivers the signals on the optical fiber to subscriber devices to provide FTTP services. Subscriber devices may include, for example, televisions, set-top boxes, telephones, computers, or other network client devices. The ONT also receives signals from subscriber devices, and transmits the signals upstream via the optical network. In this manner, the ONT can support a wide variety of services, including voice, video and data services, over the optical network.

For many premises, the ONT is connected to various subscriber devices via telephone cables, data cables, and/or radio frequency (RF) video cables to deliver services to subscriber devices. The ONT may be powered locally at the subscriber premises, often by an uninterruptible power supply (UPS). The ONT is typically mounted on an exterior wall of the subscriber premises. The subscriber devices and UPS are ordinarily located within the subscriber premises to provide easy cable access for subscribers and to protect the UPS battery from environmental variation. Therefore, ONT deployment also may require a power cable.

Interconnection of the ONT with subscriber devices using telephone, data, RF video and power cables can be burdensome. A technician needs to run the various cables through at least one wall of the premises between the ONT mounted outside the premises and the subscriber devices and UPS located within the premises. As a result, ONT deployment can be costly, time-consuming and inflexible. For example, replacement and upgrade of an ONT can be labor-intensive and present additional hardware costs.

SUMMARY

This disclosure is directed to devices and methods for simplifying ONT installation and facilitating flexible ONT configuration for an optical network. In accordance with some aspects of this disclosure, some of the functionality and components typically associated with an ONT may be relocated to a subscriber gateway device that resides within the subscriber premises. For example, gateway and/or optical MAC unit functionality ordinarily provided in the ONT may be relocated to the subscriber gateway device, which may result in a reduced number of through-wall interconnections. Relocation of components that perform gateway and MAC layer functionality to the subscriber gateway device within the subscriber premises may allow use of components in the subscriber gateway device that are less costly than industrial temperature rated components in the ONT located outside of the subscriber premises. Additionally, the electrical signals may be transmitted from the ONT to the subscriber gateway device via a common cable, thereby reducing the number of interconnections required between the ONT and subscriber premises and the number of wall penetrations required for installation.

In accordance with other techniques of this disclosure, an ONT may be configurable to operate in accordance with more than one optical network protocol. For example, the may be configurable to operate in accordance with a GPON protocol, a BPON protocol, an GEPON protocol, an active Ethernet protocol or any other passive or active optical network protocol. In this manner, the ONT may provide a common platform for receiving optical signals conforming to any of the optical network protocols using a single ONT hardware platform, thus reducing or eliminating the need for a truck roll to replace or upgrade the ONT when the optical network protocol utilized by optical network is changed.

In one embodiment, an optical network terminal that terminates an optical fiber link of an optical network comprises an optical module that receives optical signals via the optical fiber link and converts the optical signals to electrical signals and an optical media access control (MAC) unit that converts at least some of the electrical signals to data units, wherein the optical MAC unit is selectively configurable to support a plurality of optical network protocols.

In another embodiment, a method comprises receiving, with an optical network terminal, optical signals via an optical fiber link of an optical network, converting, with the optical network terminal, the optical signals to electrical signals and converting, with the optical network terminal, at least some of the electrical signals to data units. The optical network terminal is selectively configurable to support a plurality of optical network protocols.

In another embodiment, an optical network terminal that terminates an optical fiber link of an optical network comprises means for receiving optical signals via an optical fiber link of an optical network, means for converting the optical signals to electrical signals and means for converting at least some of the electrical signals to data units. The optical network terminal is selectively configurable to support a plurality of optical network protocols.

In another embodiment, a computer-readable storage medium comprising instructions that cause one or more programmable processors to receive, with an optical network terminal, optical signals via an optical fiber link of an optical network, convert, with the optical network terminal, the optical signals to electrical signals and convert, with the optical network terminal, at least some of the electrical signals to data units. The optical network terminal is selectively configurable to support a plurality of optical network protocols.

In another embodiment, a system comprises an optical network terminal (ONT) that converts optical signals received from a passive optical network (PON) via an optical fiber link to electrical signals and a subscriber gateway device coupled to the ONT via at least one cable. The subscriber gateway device includes an optical media access control (MAC) unit that receives the electrical signals from the ONT and converts the electrical signals into MAC layer signals and a gateway unit that distributes the MAC layer signals to one or more subscriber devices.

In another embodiment, a method comprises receiving, with an optical network terminal (ONT) that is connected to a passive optical network (PON) via an optical fiber link, optical signals via the optical fiber link, converting, with the ONT, the optical signals to electrical signals, sending the electrical signals from the ONT to a subscriber gateway device coupled to the ONT via at least one cable. The method also comprises converting, with the subscriber gateway device, the electrical signals into MAC layer signals and distributing, with the subscriber gateway device, the MAC layer signals to one or more subscriber devices coupled to the subscriber gateway device.

In another embodiment, an optical network terminal (ONT) connected to a passive optical network (PON) via an optical fiber link comprises an optical physical layer (PHY) component that receives optical signals from the optical network, a media converter that converts the optical signals to drive signals, and an electrical physical layer (PHY) component that transmits the electrical signals to a subscriber gateway device in accordance with the drive signals.

In another embodiment, a method comprises receiving, with an optical network terminal (ONT) that is connected to a passive optical network (PON) via an optical fiber link, optical signals via the optical fiber link, converting, with the ONT, the optical signals to electrical signals and sending, with the ONT, the electrical signals to a subscriber gateway device coupled to the ONT via at least one cable.

In another embodiment, an optical network terminal (ONT) connected to a passive optical network (PON) via an optical fiber link comprises means for receiving optical signals via the optical fiber link, means for converting the optical signals to electrical signals, and means for sending the electrical signals to a subscriber gateway device coupled to the ONT via at least one cable.

In another embodiment, a subscriber gateway device coupled to an optical network terminal (ONT) of a passive optical network (PON) via at least one cable comprises an optical media access control (MAC) unit that receives the electrical signals from the ONT and converts the electrical signals into MAC layer signals and a gateway unit that distributes the MAC layer signals to one or more subscriber devices coupled to the subscriber gateway device.

In another embodiment, a method comprises receiving, with a subscriber gateway device, electrical signals from an optical network terminal (ONT) of a passive optical network (PON) via at least one cable, converting, with the subscriber gateway device, the electrical signals into MAC layer signals, and distributing, with the subscriber gateway device, the MAC layer signals to one or more subscriber devices coupled to the subscriber gateway device.

In another embodiment, a subscriber gateway device coupled to an optical network terminal (ONT) of a passive optical network (PON) via at least one cable comprises means for receiving electrical signals from the ONT via the at least one cable, means for converting the electrical signals into MAC layer signals, and means for distributing the MAC layer signals to one or more subscriber devices coupled to the subscriber gateway device.

The details of one or more embodiments are set forth in the accompanying drawings and the description below. Other features, objects, and advantages of the techniques described in this disclosure will be apparent from the description and drawings, and from the claims.

DETAILED DESCRIPTION

This disclosure is directed to devices and methods for simplifying optical network terminal (ONT) installation and facilitating flexible ONT configuration for an optical network. For many premises, ONT installation typically requires a technician to run multiple cables between the ONT mounted outside the premises, subscriber devices located inside the premises and/or an uninterruptible power supply (UPS) located inside the premises. For example, installation may require a telephone cable for telephone services, a data cable for data services, and an optional radio frequency (RF) cable to deliver RF video services. In addition, installation typically requires an additional power cable to connect the ONT to the UPS. This disclosure presents a number of aspects that may reduce the number of cable runs required for ONT installation and/or provide other advantages. In addition, some of the aspects may result in relocation of functionality and components from the ONT to a subscriber gateway device within the subscriber premises. As a result, it may be possible to use components in the inside subscriber gateway device that are less costly than industrial temperature rated components in the outside ONT. In some aspects, the subscriber gateway device may be physically integrated with the UPS, permitting the use of a single cable that combines data and power capabilities and reducing the number of enclosures, thereby simplifying ONT installation. In other aspects, the ONT may be configurable to support different optical network protocols. In this manner, the ONT may provide flexible, reconfigurable support for different optical networks.

Figure 1:
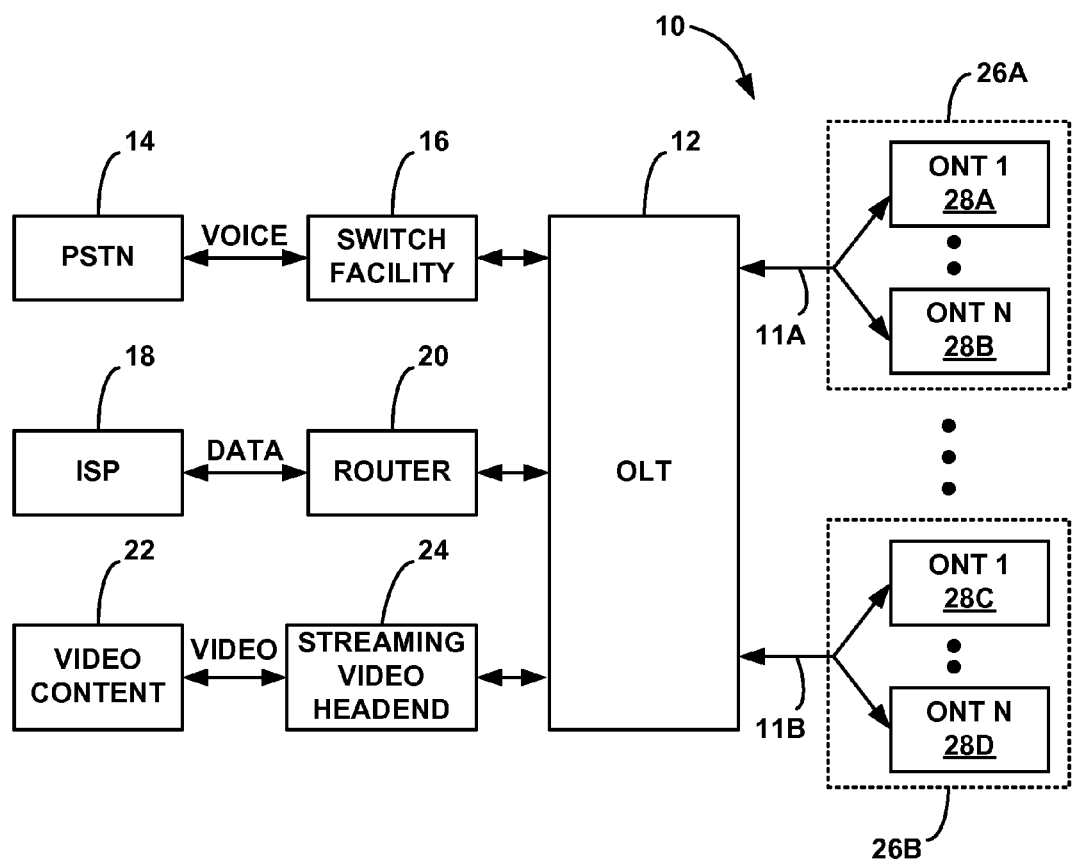
FIG. 1 is a block diagram illustrating an example optical network.

FIG. 1 is a block diagram illustrating an optical network 10. Optical network 10 can be arranged to deliver voice, data and/or video content (generally "information") to a number of subscribers (not shown in FIG. 1) via optical fiber links 11A and 11B (collectively, "optical fiber links 11"). Optical network 10 can support different network services, such as telephone services, data services and video services. Optical network 10 may generally conform to any of a variety of passive optical network (PON) standards, such as the broadband PON (BPON) standard (ITU G.983), the gigabit-capable PON (GPON) standard (ITU G.984), and gigabit-capable Ethernet PON (GEPON) standard (IEEE 802.3), as well as future PON under development by organizations such as the Full Service Access Network (FSAN) Group. Alternatively, optical network 10 may conform to any active optical network standard, such as an active Ethernet or point-to-point Ethernet standard. Optical network 10 is one example of an optical network, and should not be considered limiting of this disclosure. Some of the techniques described in this disclosure may be applicable to passive optical networks while others may be applicable to active optical networks or both passive and active optical networks.

In the example of FIG. 1, optical network 10 includes an OLT 12. OLT 12 may receive voice services such as, for example, plain old telephone service (POTS) from the public switched telephone network (PSTN) 14 via a switch facility 16. In addition, OLT 12 may be coupled to one or more Internet service providers (ISPs) 18 via the Internet and a router 20 to support data services, such as T1 data services including Internet access. As further shown in FIG. 1, OLT 12 may receive video content 22 from video content suppliers via a streaming video headend 24 to support optical radio frequency (RF) video services. Video, additionally or alternatively, may be provided as packet video over the Internet. In each case, OLT 12 receives the voice, data and/or video information, and distributes the information along optical fiber links 11 in the form of optical signals to groups 26A and 26B (collectively "groups 26") of ONTs 28. In the example of FIG. 1, each of groups 26 is coupled to a respective one of optical fiber links 11. OLT 12 may be coupled to any number of fiber links 11. For purposes of illustration, FIG. 1 shows only two fiber links 11A and 11B.

OLT 12 may be located near or far from ONTs 28. However, OLT 12 is typically located in a telecommunication company central office or remote terminal. ONTs 28 may be located at any of a variety of locations in close proximity to the residential or business premises serviced by the ONT 28. Hence, a subscriber premise serviced by an ONT 28 may refer to either residential or business premises. A subscriber may be a person or entity associated with a residential or business premises, which may be identifiable by a residential or business address, such as a postal address, a telephone number or another unique identifier.

Each one of ONTs 28 may serve a single subscriber premises, or operate on a shared basis to deliver information to two or more closely located residential or business subscriber premises, via electrical connections (e.g., copper cables) or additional optical fiber connections. ONTs 28 may deliver the information to the two or more closely located subscriber premises either directly or via a network hub, router or switch. A group 26 of ONTs 28 may refer to nodes served by OLT 12 via a common optical fiber link 11. Each group 26 in FIG. 1 contains two ONTs 28 for purposes of illustration. However, a group 26 may include a single ONT 28, or numerous ONTs, including 32 or more ONTs in some applications or installation environments.

Each of ONTs 28 includes hardware for receiving optical signals conveying information from optical network 10 via optical fiber links 11, and delivering the information to one or more network client devices within a subscriber premises (referred to as subscriber devices) as electrical signals. For example, each ONT 28 may serve as an optical network access point for one or more subscriber devices, including one or more computers, network appliances, televisions, set-top boxes, wireless devices, or the like, for delivery of data services such as Internet service. In addition, each ONT 28 may be connected to other subscriber devices in the form of subscriber telephones for delivery of telephone services. Hence, ONT 28 may provide information in the form of RF or packet video to support video services, data to support Internet access services, and voice to support telephone services.

ONTs 28 may also include hardware for receiving information in the form of electrical signals from the subscriber devices and transmitting the information upstream over optical network 10 as optical signals. For example, an ONT 28 may transmit voice information over PSTN 14 via OLT 12 and switch facility 16 in the course of a telephone conversation. In addition, an ONT 28 may transmit data to a variety of nodes on the Internet via ISP 18, router 20 and OLT 12. Multiple ONTs 28 may transmit upstream to OLT 12 over a common optical fiber link 11 using time division multiplexing techniques, and rely on downstream grant packets for assignment of upstream time slots to individual ONTs.

Determining whether to deploy optical network 10 as a passive optical network (PON) or an active optical network depends on a number of factors, including customer bandwidth demand, distance from the central office or remote terminal to the customer premises, cost of deployment, and types of services demanded. Each type of passive and active optical network deployment has advantages and disadvantages in particular market segments. Active optical networks, such as active Ethernet optical networks, may provide services over a longer range (e.g., greater than twenty kilometers) and have higher dedicated bandwidth for specific customers, such as businesses. However, active Ethernet optical networks are not as cost effective as passive optical networks due to increased cost of deployment. Additionally, active Ethernet optical networks do not provide a native analog RF video service.

Passive optical networks are generally more cost effective in medium and high population density regions and, in some optical networks such as GPONs, native RF video services may be provided. However, passive optical networks may only provide the services over shorter distances. As examples, GPONs may have a range limited to at most twenty kilometers and GEPONs may have a range that is even more limited than GPONs, e.g., less than ten kilometers. Moreover, because bandwidth is shared over a passive optical network, there is less bandwidth per customer. This may result in the inability to serve some high bandwidth customers.

Each of the types of optical networks uses different optical network protocols, also referred to herein as optical network transport protocols. For example, each of the optical network protocols may use different data packaging techniques, transmission rates, power level requirements, or other transmission requirements. For example, a GPON network uses GPON Encapsulation Method (GEM) to package data and requires high transmission rates (e.g., 2.488 gigabits per second (Gbit/s) downstream and 1.244 Gbit/s upstream), whereas GEPON uses Ethernet framing techniques and requires a symmetric 1 Gbit/s upstream and downstream rates.

Regardless of the type of optical network deployed, ONTs 28 are placed at or near the subscriber premises. In accordance with one embodiment of this disclosure, one or more of ONTs 28 may be configurable to operate in accordance with more than one optical network protocol. In other words, ONTs 28 may be configurable to operate in accordance with a GPON protocol, a BPON protocol, a GEPON protocol, an active Ethernet protocol or any other passive or active optical network protocol. In this manner, ONTs 28 provide a common platform for receiving optical signals conforming to any of the optical network transport protocol using a single ONT hardware platform.

Although the initial cost of ONTs 28 designed in accordance with this disclosure may be higher than that of an ONT that supports only a single optical network protocol, the cost disadvantage is mitigated by the reduced operation costs. For example, ONTs 28 that support more than one protocol reduce or eliminate the need for a technician to visit the subscriber premises to upgrade or replace the ONT 28 to support a different optical network protocol when optical network 10 is changed from a passive optical network protocol to an active optical network protocol, from one type of passive optical protocol to another type of passive optical protocol (e.g., GEPON to GPON, BPON to GPON, or the like), or otherwise upgraded or changed. This "truck roll," as it is commonly referred, is not only time consuming but also expensive because there may be a number of ONTs 28 located in geographically distant locations that the technician must visit prior to or immediately after changing optical network 10. In accordance with one embodiment of this disclosure, ONTs 28 are reconfigured to operate in accordance with the upgraded optical network protocol without any need to visit the subscriber premises. In fact, in some embodiments, ONTs 28 are automatically self-configured to support the upgraded optical network protocol. In this case, there is not even a need for a network administrator to remotely configure ONTs 28.

Figure 2:
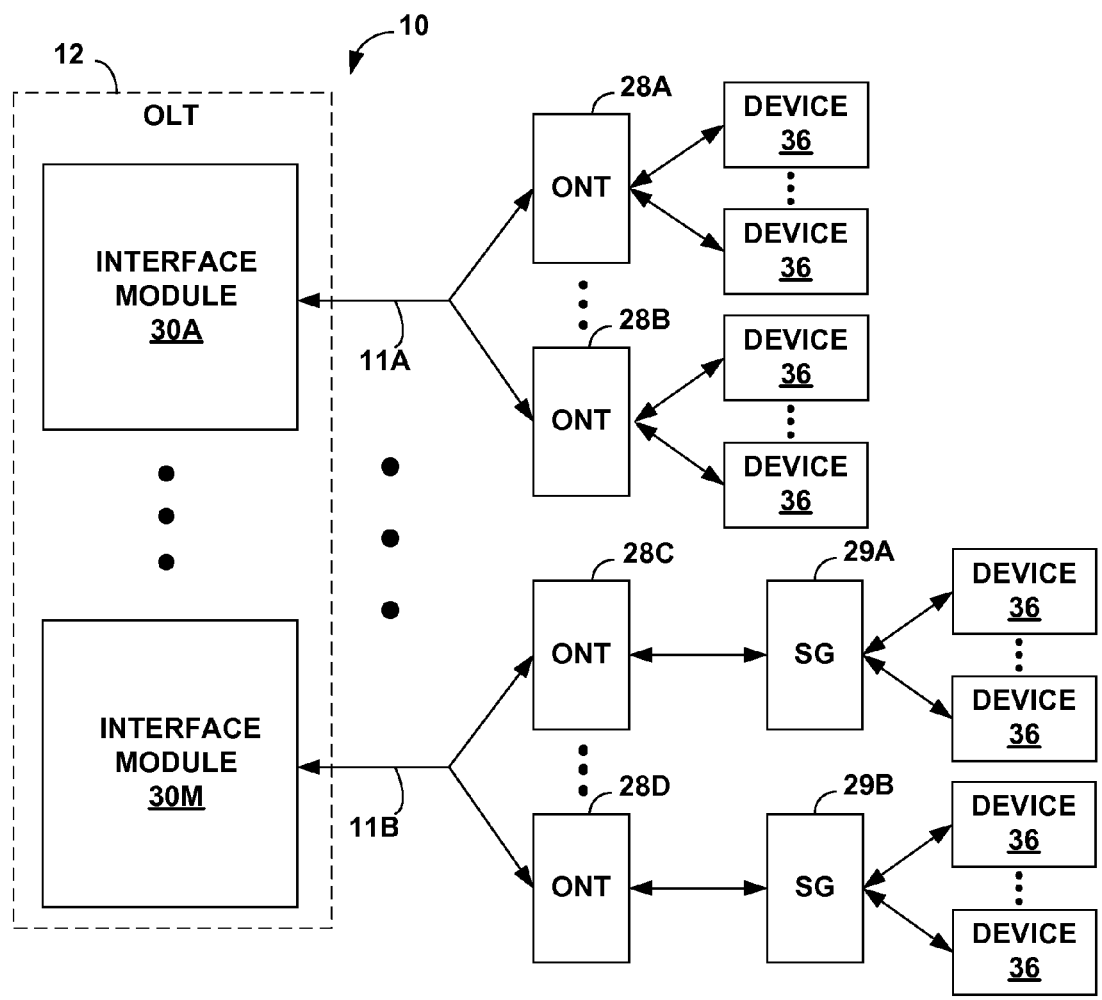
FIG. 2 is a block diagram illustrating the example optical network of FIG. 1 in further detail.

FIG. 2 is a block diagram illustrating optical network 10 in further detail. OLT 12 of optical network 10 includes interface modules 30A-30M (collectively "interface modules 30"). Each interface module 30, sometimes referred to as a line card, is coupled to a group of ONTs 28A-28D (collectively, "ONTs 28") via a respective one of fiber links 11. OLT 12 may include multiple interface modules 30, e.g. arranged in a common chassis. Each interface module 30 may form an independent interface that serves a group of ONTs 28 coupled to a common optical fiber link 11. In the example illustrated in FIG. 2, interface module 30A services ONTs 28A and 28B and interface module 30M services ONTs 28C and 28D. Hence, interface modules 30 and ONTs 28 terminate opposite ends of optical fiber links 11. In the example of a PON, information sent by OLT 12 is received by all ONTs 28 on optical fiber links 11. In an active optical network, however, information is actively routed to the appropriate ONTs 28.

Interface modules 30 support upstream and downstream communication of voice and data, and optional downstream communication of RF video and upstream RF return. In a GPON-configured PON, for example, downstream voice and data traffic may be transmitted on the 1490 nanometer (nm) wavelength and upstream traffic is transmitted on 1310 nm wavelength, using wavelength division multiplexing (WDM). Optional RF analog video is transmitted in the 1550 nm band. Alternatively or in addition to RF video, packet video may be transmitted with other voice and data packets in the 1490 nm band.

ONTs 28 act as an interface between optical network 10 and one or more subscriber devices 36. In other words, subscriber devices 36 may access services provided over optical network 10 via respect ONTs 28. For example, an ONT 28 may act as an interface that allows voice, video and/or data information to flow from the optical fiber framework of optical network 10 to an electrical metallic framework, such as a copper cable (e.g., telephone, Cat 5, Cat 5e, or the like) or coaxial cable, and/or wireless framework, such as a wireless access point. For instance, ONT 28 may interface with multiple frameworks by performing an optical to electrical conversion on information from interface modules 30 for transmission to subscriber devices 36. ONTs 28 may also act as an interface for information transmitted in the opposite direction, i.e., from an electrical metallic framework or wireless framework to an optical fiber framework.

Each of ONTs 28, which may be located on the outside of the subscriber premises, delivers the information over the electrical metallic framework (e.g., via one or more electrical cables) to one or more subscriber devices 36 located on the inside of the customer premises. Subscriber devices 36 may include, without limitation, telephones, televisions, computers, wireless access points, routers, and the like. In some instances, some ONTs, e.g., ONTs 28A and 28B of FIG. 2, may deliver the information directly to the respective subscriber devices 36 via one or more telephone cables, data cables, radio frequency (RF) video cables, and/or other types of electrical cables that extend through at least one wall of the subscriber premises. ONTs 28A and 28B may, in the downstream direction, receive optical signals via optical fiber link 11A, convert the optical signals to electrical signals, convert the electrical signals into MAC layer signals (e.g., frames, cells, packets or other data units), and distribute the MAC layer signals to the appropriate subscriber devices 36.

In other instances, some ONTs, e.g., ONTs 28C and 28D of FIG. 2, may deliver the information over the electrical metallic framework to subscriber gateway devices 29A and 29B, respectively, via one or more cables. In one embodiment, ONTs 28C and 28D deliver the information to respective subscriber gateway devices 29 via a single cable that extends through the at least one wall of the subscriber premises. Subscriber gateway devices 29, in turn, deliver the information to subscriber devices 36 via one or more telephone cables, data cables, radio frequency (RF) video cables, and/or other electrical cables. In this example, at least some of the functionality of ONTs 28C and 28D is relocated to the respective subscriber gateway devices 29A and 29B, respectively. As will be described in detail below, subscriber gateway devices 29 may convert the electrical signals into MAC layer signals (e.g., frames, cells, packets or other data units) and distribute the MAC layer signals to the appropriate subscriber devices 36. In this manner, at least some MAC and gateway functionality may be relocated from ONTs 28C and 28D to subscriber gateway devices 29A and 29B, respectively. In other embodiments, MAC functionality may be retained by ONTs 28C and 28D, but at least some gateway functionality may be relocated to subscriber gateway devices 29A and 29B. In this case, ONTs 28C and 28D may convert the electrical signals into MAC layer signals (e.g., frames, cells, packets or other data units) and provide the MAC layer signals to subscriber gateway devices 29A and 29B, which distribute the MAC layer signals to the appropriate subscriber devices 36, e.g., based on IP or MAC headers, or other high level identifiers.

Subscriber gateway devices 29 are therefore responsible for delivering the data units to the appropriate subscriber devices 36 within the premises and, in some embodiments, generating the data units in accordance with the optical network protocol. Accordingly, the interconnections with subscriber devices 36 are made within the subscriber premises between subscriber gateway devices 29 and subscriber devices 36, such as telephones, computers, set-top boxes and the like. Consequently, in this example, multiple, direct interconnections are not required between subscriber devices 36 within the subscriber premises and ONTs 28C and 28D outside the subscriber premises. Instead, ONTs 28C and 28D may communicate with respective subscriber gateway devices 29 via a simplified, through-wall connection. In some embodiments, the through-wall connection may comprise a single electrical cable to carry data signals comprising signals to support voice and data services, rather than separate telephone and data cables.

Moreover, one or more of ONTs 28 may be configurable to operate in accordance with more than one optical network protocol. For example, ONTs 28 may be configurable to operate in accordance with a GPON protocol, a BPON protocol, a GEPON protocol, an active Ethernet protocol or any other passive or active optical network protocol. In this manner, ONTs 28 may provide a common platform for receiving optical signals conforming to any of the optical network protocols using a single ONT hardware platform, thus reducing or eliminating the need for a truck roll to replace or upgrade the ONT when the optical network protocol utilized by optical network 10 is changed.

Figure 3:
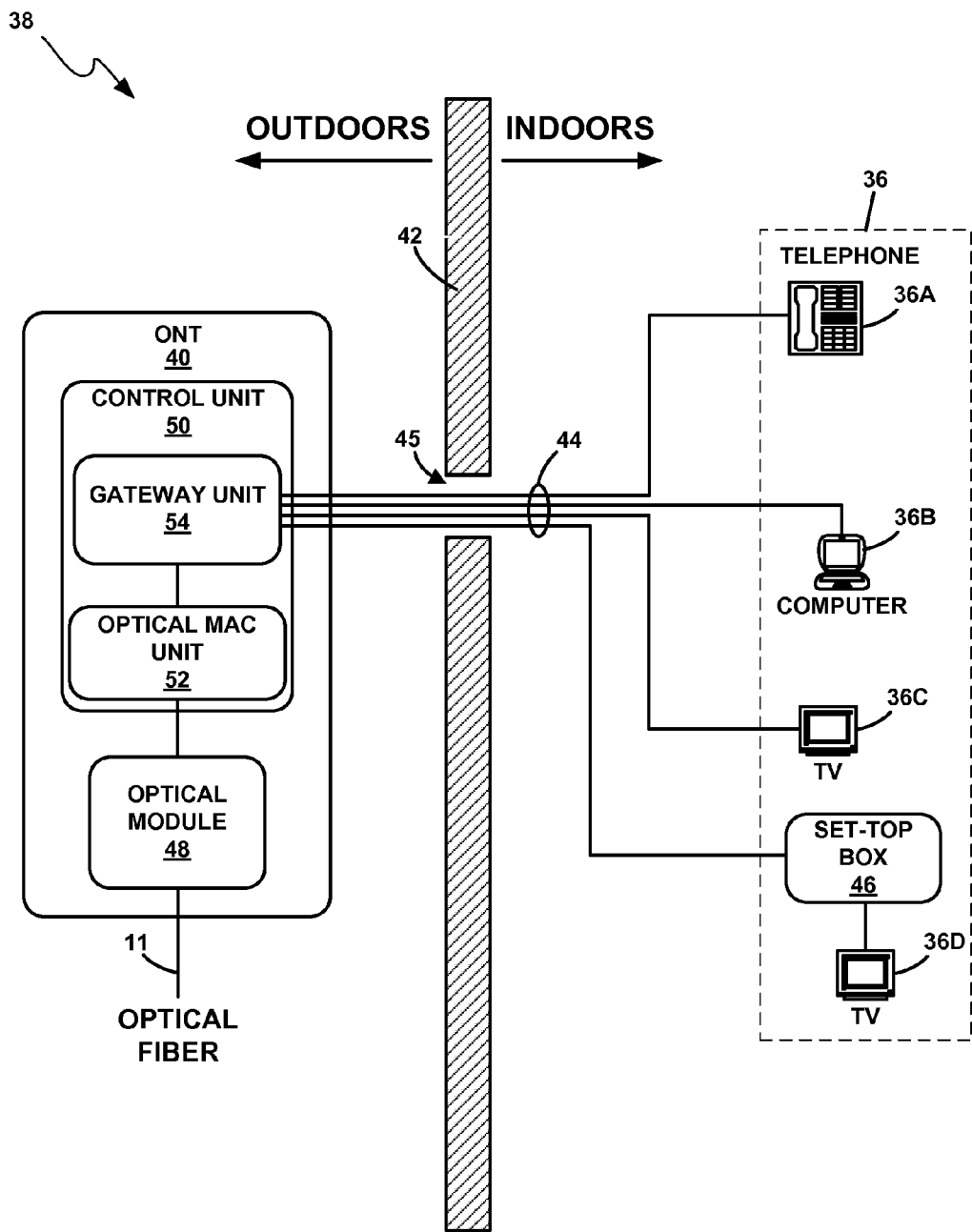
FIG. 3 is a block diagram illustrating a system in which an ONT couples to a plurality of subscriber devices.

FIG. 3 is a block diagram illustrating a system 38 in which an ONT 40 couples to a plurality of subscriber devices 36. ONT 40 may be mounted on an exterior surface of a wall 42 of the subscriber premises, i.e., outdoors. ONT 40 connects to subscriber devices 36 located within the subscriber premises, i.e., indoors, via one or more cables 44 that extend through one or more through-wall penetrations 45. Subscriber devices 36 may include one or more telephones, computers, televisions or other devices. In the example illustrated in FIG. 3, subscriber devices 36 include a telephone 36A, a computer 36B, and televisions 36C and 36D. ONT 40 may, however, be coupled to more or fewer subscriber devices 36.

ONT 40 may connect to each of subscriber devices 36 via separate cables 44. Cables 44 may be electrical cables that include one or more conductors made from materials such as copper, aluminum or other conductive material. Cables 44 may be unshielded twisted pair cables, shielded twisted pair cables, coaxial cables or other types of cables, or a combination of different types of cables. For example, ONT 40 may connect to telephone 36A via a telephone cable (e.g., category 1 twisted pair cable), connect to computer 36B via a data cable (e.g., category 3, category 5, or category 5e twisted pair cable), and couple to television 36C via a coaxial cable. In some instances, ONT 40 may not directly couple to one or more of subscriber devices 36, but instead couple to the subscriber devices 36 (e.g., television 36D) via one or more intermediary devices, such as a set-top box 46. ONT 40 couples, e.g., via a data cable, to set-top box 46, which then couples to television 36D. In other instances, ONT 40 may connect to subscriber devices 36 via a subscriber gateway device 29 (FIG. 2) as will be described in further detail below.

ONT 40 also connects to an optical network via optical fiber 11. As described above, the optical network to which ONT 40 connects may be any type of optical network, including any of a variety of passive optical networks (e.g., GPON, GEPON, or BPON) or active optical network (e.g., active Ethernet). In accordance with one embodiment of this disclosure, ONT 40 may be configurable to operate in accordance with more than one optical network protocol. In other words, ONT 40 provides a common platform for receiving optical signals conforming to any of the optical network protocols.

ONT 40 includes an optical module 48 and a control unit 50 that includes an optical media access controller (MAC) 52 and a gateway unit 54. Optical module 48 provides an interface for transmitting and receiving optical signals over optical fiber 11. Optical module 48 includes optical and/or electrical components used for transmitting and receiving optical signals via optical fiber 11. Optical module 48 may include one or more electrical-to-optical (E/O) conversion circuitry components for transmission of optical signals, such as a laser diode, a laser diode driver, and wavelength division multiplexing (WDM) optics. Optical module 48 may also include one or more optical-to-electrical (O/E) conversion circuitry components for receiving optical signals, such as WDM optics, a photosensor diode, a transimpedance amplifier, and a limit amplifier. The components described above are provided for purposes of illustration and should not be limiting of the embodiments described herein. Optical module 48 may include additional optical and/or electrical components in addition to the components mentioned above. For example, optical module 48 may optionally include RF O/E conversion circuitry for reception of downstream optical signals carrying RF video, and RF E/O conversion circuitry for transmission of upstream RF return signals.

Optical module 48 functions as a media converter that converts optical signals received as downstream transmissions via optical fiber 11 to electrical signals, and converts electrical signals, including electrical signals received from subscriber devices 36, to optical signals for upstream transmission via optical fiber 11. Thus, optical module 48 terminates the optical signals received via optical fiber 11, and produces electrical physical (PHY) layer signals. As such, optical module 48 may be viewed as providing physical (PHY) layer functions, or layer 1 functions, of the open systems interconnection (OSI) model to output electrical PHY layer signals. The electrical PHY layer signals may be in the form of raw bits, e.g., zeros and ones. In some instances, optical module 48 may be permanently mounted within ONT 40. In other instances, optical module 48 may be a removable optical module as described in further detail in this disclosure.

Optical MAC unit 52 of control unit 50 receives the PHY layer signals, e.g., in the form of raw bits, output by optical module 48. Optical MAC unit 52 represents a module that implements at least a portion of the data link layer, or layer 2, of the OSI model. Optical MAC unit 52 may, for example, convert PHY layer signals received from optical module 48 to distinct data units, such as Ethernet frames, ATM cells, or other types of data units, for transmission to subscriber devices 36, as well as convert these distinct data units received from subscriber devices to PHY layer signals for upstream transmission over optical fiber 11. Optical MAC unit 52 may also provide channel access control mechanisms that enable several subscriber devices, e.g., subscriber devices 36, to share a given data link, such as optical fiber 11.

Optical MAC unit 52 provides the data units to gateway unit 54, which distributes the data units to the appropriate one of subscriber devices 36 via respective cables 44. Gateway unit 54 may analyze address information within each of the data units to determine whether to forward any of the data units to subscriber devices 36. The address information analyzed by gateway unit 54 may be IP addresses, MAC addresses, or the like. If the address of one of the data units matches an address of one of subscriber devices 36, then gateway unit 54 relays the frame, either directly or through one or more intermediate devices, to the subscriber device 36 corresponding to the address via the respective cable 44. If the address of one of the data units does not match an address of one of subscriber devices 36, an intermediate device (such as set-top box 46) coupling ONT 40 to one of the subscriber devices 36, or ONT 40, then ONT 40 discards the data unit. Gateway unit 54 may include one or more switches, integrated access devices (IADs), or other components to switch, router or otherwise distribute the data units to subscriber devices 36. Thus, gateway unit 54 performs gateway functions of ONT 40 to reject packets not destined for any of subscriber devices 36 and distribute the data units destined for subscriber devices 36 to the appropriate subscriber devices 36.

Control unit 50 may be implemented in hardware, software, firmware, or a combination thereof. Control unit 50 of ONT 40 may be formed in part by an integrated circuit (IC). The IC may include, for example, one or more microprocessors, digital signal processors (DSPs), field-programmable gate arrays (FPGAs), application-specific integrated circuits (ASICs), application-specific standard products (ASSPs), or a combination thereof. That is, optical MAC unit 52 and gateway unit 54 may comprise any combination of one or more processors, one or more FPGAs, one or more ASICs, and one or more ASSPs. Control unit 50 may also comprise memory, both static (e.g., hard drives or magnetic drives, optical drives, FLASH memory, EPROM, EEPROM, etc.) and dynamic (e.g., RAM, DRAM, SRAM, etc.), or any other computer readable storage medium capable of storing instructions that cause the one or more processors to perform the techniques described in this disclosure.

In accordance with one embodiment of this disclosure, ONT 40 may be configurable to support more than one optical network protocol. Optical MAC unit 52 of ONT 40 may be selectively configured using a plurality of MAC configurations to support the optical network protocol of optical network 10 (FIG. 1). For example, control unit 50 may store, e.g., within memory, a plurality of MAC configurations that each include configuration data corresponding to a different optical network protocol supported by ONT 40. Optical MAC unit 52, which may be implemented using a configurable processing element, such as an FPGA, may be selectively configured using one of the plurality of MAC configurations to operate in accordance with the optical network protocol of optical network 10. Optical MAC unit 52 may be automatically configured to support the optical network protocol.

Alternatively, a network administrator may configure optical MAC unit 52 remotely over optical network 10, e.g., via a remote management system or provisioning system. In either case, ONT 40 may provide a common hardware platform for receiving optical signals conforming to any of the supported optical network protocols. Moreover, because optical MAC unit 52 supports multiple optical network protocols, a single management system may be used to manage ONT 40. Thus, the need for different management systems to manage multiple different ONT types may be eliminated.

In some instances, optical MAC unit 52 may automatically configure itself to support the optical network protocol of optical network 10. Optical MAC unit 52 may automatically configure itself upon initially being connected to optical fiber 11 or upon beginning to receive optical signals in accordance with a different optical network protocol. As one example, upon initially being connected to optical fiber 11, optical MAC unit 52 may load a first configuration to configure itself to support a first optical network protocol, e.g., the GPON protocol. After configuration, optical MAC unit 52 may determine whether optical network 10 is deployed using the first optical network protocol, e.g., comparing one or more protocol transmission requirements of the first optical network protocol with actual transmission characteristics of optical network 10.

If optical MAC unit 52 determines that optical network 10 is not deployed using the first optical network protocol, optical MAC unit 52 may load a second MAC configuration to reconfigure itself to support a second optical network protocol, e.g., active Ethernet protocol. Optical MAC unit 52 may continue to load different MAC configurations until optical MAC unit 52 is configured to support the optical network protocol deployed over optical network 10. Alternatively, a processor or other component of ONT 40 may configure optical MAC unit 52 in a similar manner. In either case, ONT 40 may implement a transport discovery protocol that allows ONT 40 to automatically discover the optical network protocol of the optical network to which ONT 40 has been connected. Automatically configuring optical MAC unit 52 may reduce the complexity of installation as the installation procedure is automatic (i.e., not manually performed by an administrator remotely or a technician on site). Moreover, the installation procedure may be independent of the optical network protocol, thus simplifying technician training. In particular, the technician installing the ONT need not be trained on different configuration methods for the different optical network terminals. Instead, the installation and configuration is the same for all optical network protocols.

In embodiments in which ONT 40 is configurable to support more than one optical network protocol, optical module 48 is capable of supporting transmission requirements of each of the optical network protocols. In other words, optical module 48 includes hardware components, such as a laser diode, that are capable of meeting transmission rates, power levels, or other requirements of each of the supported optical network protocols. In some cases, the components of optical module 48 exceed the requirements of the optical network protocol deployed within the optical network.

If ONT 40 supports GPON and GEPON, for example, the hardware components of optical module 48 may be capable of supporting 2.488 Gbit/s downstream and 1.244 Gbit/s upstream transmission rates. When such an ONT 40 is deployed in GEPON, which only has a transmission bit rate of approximately 1.0 Gbit/s, the hardware components of optical module 48 exceed the transmission requirements of GEPON. In other words, the optical requirements of GPON are a superset of the requirement for GEPON. Thus, if the ONT was designed to only support GEPON, the hardware components used may cost less due to the different transmission requirements of GEPON. The initial cost of an ONT 40 that designed to support GEPON and GPON may therefore be higher than that of an ONT that supports only a single optical network protocol.

However, the increased initial cost of an ONT that supports multiple optical network protocols may be mitigated by the reduced operation costs. For example, supporting more than one protocol may reduce or eliminate the need for a truck roll to later replace or upgrade the ONT when the optical network protocol is changed after the ONT is installed, e.g., from a passive optical network to an active optical network or from one type of passive optical network to another type of passive optical network. As another example, installation may be simplified by automatically configuring optical MAC unit 52 and reducing the amount of technician training. Additionally, because ONT 40 may support GPON, network providers may serve GEPON or active Ethernet customers with RF video service.

Figure 4:
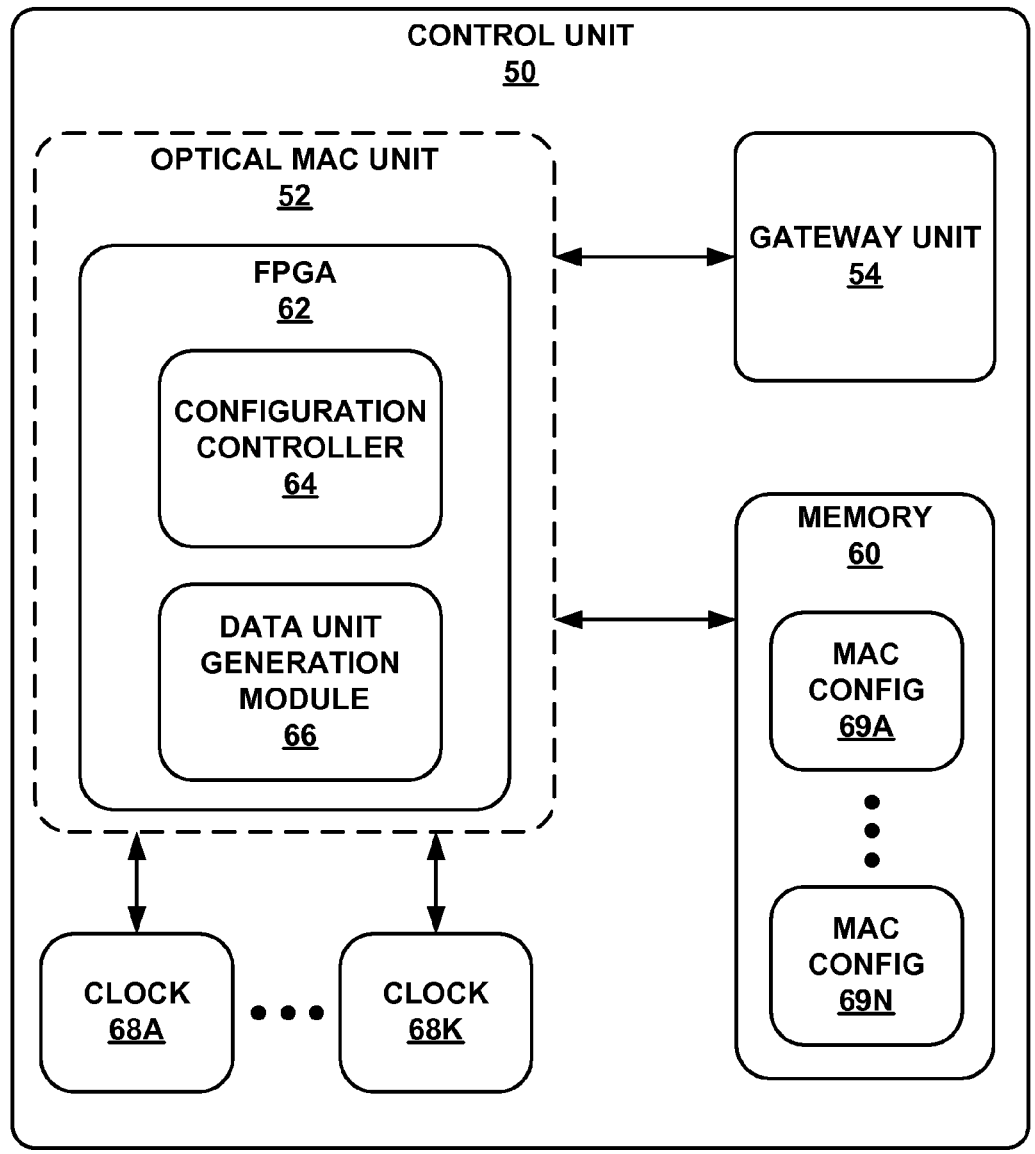
FIG. 4 is a block diagram illustrating an example control unit of an ONT.

FIG. 4 is a block diagram illustrating control unit 50 in further detail. As shown in FIG. 4, control unit 50 includes optical MAC unit 52, gateway unit 54, memory 60 and clock oscillators 68A-68K (collectively, "clock oscillators 68"). Optical MAC unit 52 is a field programmable gate array 62 ("FPGA 62"). FPGA 62 includes a configuration controller 64 and a data unit generation module 66. Configuration controller 64 represents a module that selectively configures FPGA 52 to support different optical network protocols. FPGA 62 is coupled to memory 60, which includes MAC configurations 69A-69N (collectively, "MAC configurations 69"). Each of MAC configurations 69 represents a set of configuration information for configuring FPGA 62 to operate in accordance with one of the supported optical network protocols. For example, each of MAC configurations 69 may specify a bit rate, timing, packet size, packet structure, or other parameter of the corresponding optical network protocol.

To configure FPGA 62, configuration controller 64 loads one of MAC configurations 69 from memory 60. In the example illustrated in FIG. 4, optical MAC unit 52 supports N different optical network protocols, where N>1. The optical network protocols supported by optical MAC unit 52 may include GPON, BPON, GEPON protocol, active Ethernet, or any other passive or active optical network protocol. Memory 60 may be a FLASH memory, EPROM, EEPROM, RAM, DRAM, SRAM, or any other data storage element.

In some embodiments, configuration controller 64 may automatically select the MAC configuration 69 to load to configure FPGA 62. Configuration controller 64 may automatically load one of MAC configurations 69 upon connecting the ONT 40 to optical fiber 56. For example, configuration controller 64 may select and load a first one of MAC configurations 69, such as MAC configuration 69A, to configure FPGA 62 to operate in accordance with a first optical network protocol.

Configuration controller 64 may determine, while operating in accordance with the first optical network protocol associated with loaded MAC configuration 69A, whether FPGA 62 is appropriately configured to support the optical network protocol of optical network 10. Configuration controller 64 may determine whether FPGA 62 is appropriately configured by comparing one or more protocol transmission requirements of the first optical network protocol with actual transmission characteristics of optical network 10. For example, configuration controller 64 may compare a downstream transmission bit rate or an estimate of the bit rate with the expected downstream transmission bit rate of the first optical network protocol. If the bit rate or estimate of the bit rate at which the optical signals are received corresponds with the expected bit rate of the first optical network protocol, configuration controller 64 determines FPGA 62 is appropriately configured. If the bit rate or the estimate of the bit rate is different, however, configuration controller 64 determines FPGA 62 is not appropriately configured.

As another example, configuration controller 64 may determine whether FPGA 62 is appropriately configured based on data generated by data unit generation module 66. If the FPGA 62 is configured to operate in accordance with an incorrect optical network protocol, configuration controller 64 may not recognize the data generated by data unit generation module 66, but instead obtain noise. For example, configuration controller 64 may analyze the data output by data unit generation module 66 to determine whether the data unit header is recognized. The header may be a pattern guard of ones and zeros or some fixed size overhead information that acts as a sort ob bit signature that is protocol dependent. In some embodiments, configuration controller 64 analyzes a combination of different protocol requirements.

When configuration controller 64 determines that FPGA is not appropriately configured, configuration controller 64 loads a second MAC configuration, e.g., MAC configuration 69B, to configure FPGA 62 to operate in accordance with a second optical network protocol. Configuration controller 64 continues to load MAC configurations 69 until FPGA 62 is configured to operate in accordance with the optical network protocol utilized by optical network 10 to which the ONT is connected. In this manner, configuration controller 64 may automatically configure optical MAC unit 52.

Alternatively, configuration controller 64 may receive a command from a technician, either by interfacing directly with configuration controller 64 via a management interface or by way of a provisioning system, that specifies the appropriate one of MAC configurations 69. For example, the command, which may be provided by a technician on site, may provide a configuration identification that identifies the appropriate one of MAC configurations 69, i.e., the MAC configuration that corresponds with the optical network protocol of the optical network to which ONT 40 is attached. In other instances, the technician may provide the configuration data that is included with the appropriate MAC configuration 69 along with the configuration command. In this case, memory 60 may not store multiple sets of MAC configurations 69. In response to the command, configuration controller 64 loads the appropriate MAC configuration 69 to configure optical MAC unit 52 or configures optical MAC unit 62 using the configuration commands provided with the command.

After configuring optical MAC unit 52 to operate in accordance with the optical network protocol associated with the loaded MAC configuration 69, data unit generation module 66 receives PHY layer signals from optical module 48, converts the PHY layer signals to MAC layer signals, and provides the MAC layer signals to gateway unit 54 for distribution to subscriber devices 36. Operation of gateway unit 54 is described above in detail with respect to FIG. 3.

Control unit 50 may select a clock signal from one of clock oscillators 68. Clocks 68 may be one or more oscillators that generate clock signals. Each of clock oscillators 68 may generate a clock signal for use in controlling the timing of received and transmitted data for different optical network protocols. For example, one clock oscillator, e.g., clock oscillator 68A, may generate a clock signal for use in a GPON network and a second clock oscillator, e.g., clock oscillator 68B, may generate a clock signal for use in an active Ethernet network. The configuration data associated with the optical network protocol for which optical MAC unit may be configured to indicate which clock signal is to be selected by control unit 50. In this manner, the multiple clock oscillators 68 allow the control unit to correctly synchronize with the inbound and outbound optical signals.

Control unit 50 illustrated in FIG. 4 is provided for purposes of illustration. Control unit 50 may include additional components or the components illustrated in FIG. 4 may be rearranged. For example, configuration controller 64 may not be implemented within FPGA 62. Instead, configuration controller 64 may be implemented in a different processing element, e.g., using a separate processor. Although described above with respect to FPGA 62, the techniques may be implemented in any combination of hardware, software, firmware or any combination thereof. Thus, FPGA 62 is merely provided for purposes of illustration and the techniques may be implemented using any combination of ASSPs, ASICs, or any other configurable processing elements. Accordingly, the techniques should not be limited to the exemplary embodiment described above.

Figure 5:
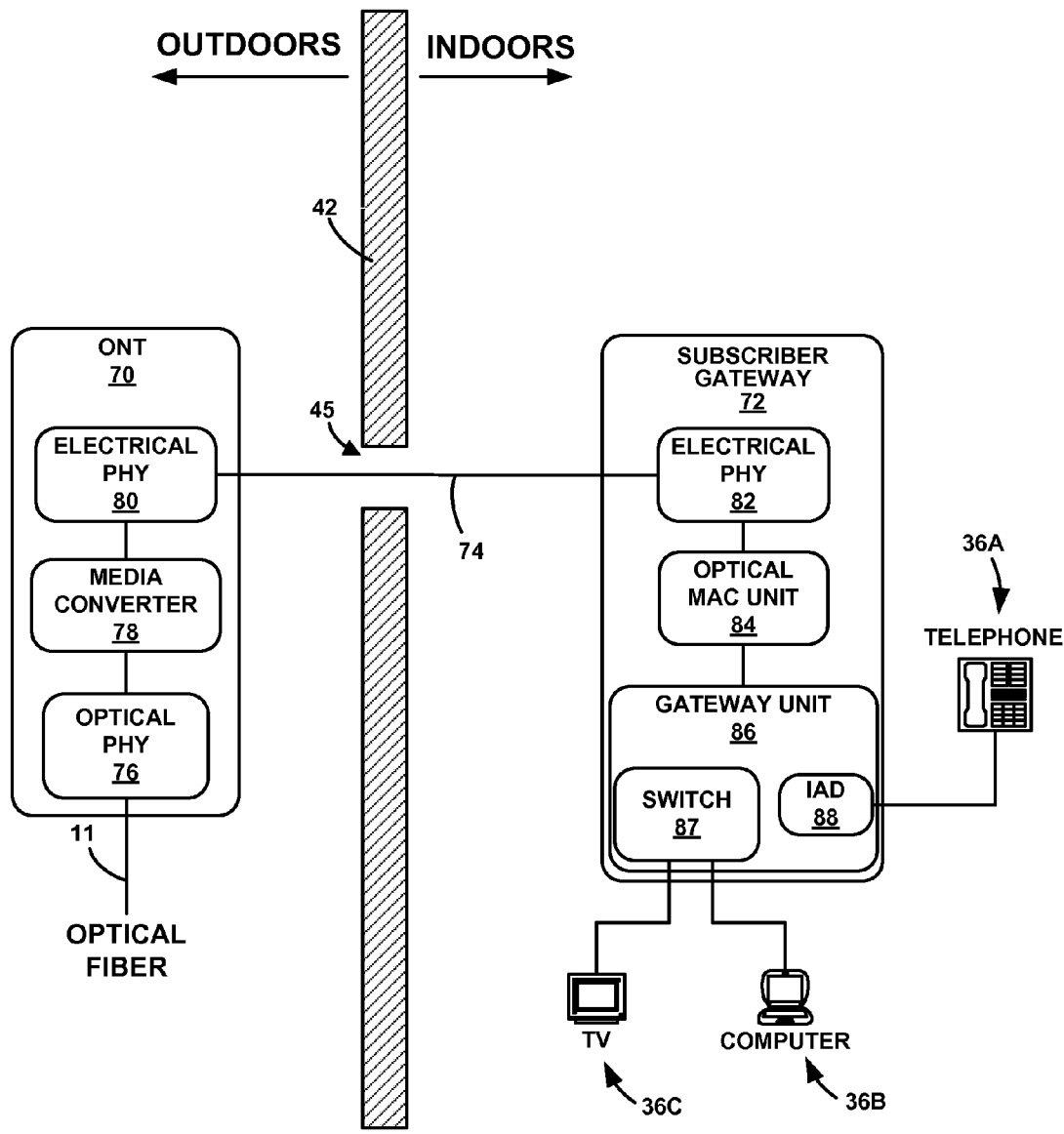
FIG. 5 is a block diagram illustrating a system in which an ONT and a subscriber gateway device perform gateway and MAC layer functions in accordance with one embodiment of this disclosure.

FIG. 5 is a block diagram illustrating a system in which an ONT 70 and a subscriber gateway device 72 that perform gateway and MAC layer functions in accordance with one embodiment of this disclosure. As will be described in detail below, the gateway and MAC layer functions typically performed by ONT 70 are relocated to subscriber gateway device 72. ONT 70 may be mounted on an exterior surface of a wall 42 of the subscriber premises, i.e., outdoors. Subscriber gateway device 72 may be located somewhere within the subscriber premises, i.e., indoors.

ONT 70 connects to subscriber gateway device 72 via one or more cables. In the example illustrated in FIG. 5, ONT 70 connects to subscriber gateway device 72 via a single cable 74 that provides a single though-wall connection between ONT 70 and subscriber gateway device 72. Cable 74 may be an electrical cable that includes one or more conductors made from materials such as copper, aluminum or other conductive material. Cables 74 may be a combination of one or more twisted pairs of conductors, coaxial conductors or other types of conductors. In one instance, cable 74 may be a data cable, such as category 3 cable, category 5 cable, or category 5e cable. Subscriber gateway device 72 couples to subscriber devices 36, e.g., a telephone 36A, computer 36B, and television 36C, in the example illustrated in FIG. 5, via separate cables, such as telephone cables, data cables, RF cables or the like.

ONT 70 includes an optical PHY component 76, a media converter 78, and an electrical PHY component 80. Optical PHY component 76 transmits and receives optical signals via optical fiber 11. Thus, optical PHY component 76 provides an interface for transmitting and receiving the optical signals, e.g., in the form of light signals representing raw bits, over optical fiber 11. For example, optical PHY component 76 converts the light signals received on optical fiber 11 to a current. Electrical PHY component 80 transmits and receives electrical signals via cable 74. As such, electrical PHY component 80 provides an interface for transmitting and receiving the electrical signals, e.g., in the form voltage signals representing raw bits, over cable 74. Media converter 78 converts downstream signals output by optical PHY component 76 into drive signals for electrical PHY component 80. Likewise, media converter 78 converts upstream signals received by electrical PHY component 80 into drive signals for optical PHY component 76. In one example, media converter 78 may comprise a laser driver that converts differential voltage signal to a current drive signal and/or a limit amplifier that converts a current to a differential voltage drive signal. Optical PHY component 76, media converter 78 and electrical PHY component 80 may, for example, include O/E conversion circuitry and E/O conversion circuitry to perform the conversion from optical signals to electrical signals and from electrical signals to optical signals, respectively. In one embodiment, optical PHY component 76 and media converter 78 may be included within an optical module, such as optical module 48 of FIG. 3 or a pluggable optical module as described later in this disclosure.

In the downstream direction, optical PHY component 76 receives downstream optical signals via optical fiber 101. Optical PHY component 76 provides the downstream optical signals to a media converter 78, which converts the optical signals into electrical signals. An O/E converter of media converter 78 may, for example, convert an output of a photodiode, e.g., a current output by the photodiode, of optical PHY component 76 that identifies when a laser is on/off into a differential voltage signal to drive a cable equalizer of electrical PHY component 80. The cable equalizer conditions the differential voltage drive signal for to set the signal to a voltage high (e.g., 5 volts) when the photodiode detects light on optical fiber 11 and set the signal to a voltage low (e.g., 0 volts) when the photodiode does not detect light on optical fiber 11. Media converter 78 may generate drive signals for other electrical components that transmit electrical signals. For example, media converter 78 may generate drive signals for a modulator of electrical PHY component 80 such that the modulator modulates a carrier signal at a first frequency when the photodiode detects light on optical fiber 11 and modulates the carrier signal at a second frequency when the photodiode does not detect light on optical fiber 11. Media converter 78 provides the electrical signals to electrical PHY component 80, which sends the electrical signals over cable 74 to subscriber gateway device 72. As such, in the downstream direction, ONT 70 may be viewed as extending the optical network over electrical cable 74.

In the upstream direction, electrical PHY component 80 receives electrical signals via cable 74. In the case of voltage pulses, electrical PHY component may detect the electrical signals using a voltage sensor of electrical PHY component 80. Media converter 78 converts the electrical signals output by the voltage sensor into drive signals for optical PHY 76. For example, media converter 78 may convert the electrical signals into current signals used to drive a laser diode of optical PHY component 76 to generate optical signals for upstream transmission to OLT 12 (FIGS. 1 and 2).

Subscriber gateway device 72 includes an electrical PHY component 82, an optical MAC unit 84, and a gateway unit 86. Like electrical PHY component 80 of ONT 70, electrical PHY component 82 provides an interface for transmitting and receiving the electrical signals, e.g., in the form of raw bits, over cable 74. Electrical PHY component 82 may include a voltage source and a voltage sensor to transmit and receive voltage pulses or a modulator and demodulator to transmit and receive modulated carrier signals.

Like optical MAC unit 52 of FIG. 3, optical MAC unit 84 represents a module that implements at least a portion of the data link layer, or layer 2, of the OSI model. Optical MAC unit 84 may convert physical layer signals to distinct data units, such as Ethernet frames, ATM cells, or other types of data units, for distribution to subscriber devices 36 in the downstream direction, as well as convert data units from subscriber devices 36 to physical layer signals for sending to ONT 70. Optical MAC unit 84 may also provide addressing and channel access control mechanisms that enable several subscriber devices, e.g., subscriber devices 36, to share a given data link, such as cable 74 and optical fiber 11. Thus, optical MAC unit 84 performs MAC layer functions typically performed by ONT 70. Optical MAC unit 84 may be formed in part by an IC, which may include, for example, one or more of a microprocessor, a DSP, an FPGA, an ASIC and/or an ASSP.

Optical MAC unit 84 may be configurable to support more than one optical network protocol as described above in detail with respect to FIGS. 3 and 4. Optical MAC unit 84 of subscriber gateway device 72 may be selectively configured using one of a plurality of MAC configurations corresponding to different optical network protocols. In some instances, optical MAC unit 84 may be implemented using a configurable processing element, such as an FPGA, that is automatically configured using the plurality of MAC configurations.

In other instances, optical MAC unit 84 is remotely configured by a network administrator using a management system or provisioning system.

Optical MAC unit 84 provides the data units, e.g., frames, to gateway unit 86, which distributes the frames to the appropriate one of subscriber devices 36 in accordance with the addressing information within the frames. In particular, in the example of FIG. 5, gateway unit 86 includes a switch 87 and an integrated access device (IAD) 88 that couple to one or more analog telephone cables and data cables, respectively. A variety of subscriber devices 36 may be coupled to subscriber gateway device 72 via the telephone cables and data cables. For example, one or more telephones 36A may be coupled to subscriber gateway device 72 via IAD 88 and the telephone cables. Thus, IAD 88 functions as a telephone interface of gateway unit 86. Similarly, one of more computers 36B, televisions 36C, set-top boxes (not shown in FIG. 5) or the like may be coupled to subscriber gateway device 72 via switch 87 and the data cables.

IAD 88 and switch 87 of gateway unit 86 may examine the addressing information e.g., MAC or IP addresses, of the data units to determine whether to forward the data units to one or more subscriber devices coupled to IAD 88 or switch 87. If the address of the data unit matches an address of telephone 36A supported by IAD 88, then IAD 88 provides the data unit to the appropriate device. For data services, if the address of a data unit matches the address of one of the subscriber devices (e.g., computer 36B or television 36C) served by switch 87, then switch 87 may select the appropriate port on which to forward the data unit. The addressing information analyzed by IAD 88 and switch 87 may include MAC address information, IP address information or the like. In this manner, gateway unit 86 also performs the gateway functions typically performed by ONT 70.

As described above, the example system illustrated in FIG. 5 relocates the gateway and MAC layer functions typically performed by ONT 70 to subscriber gateway device 72. In other words, data layer processing circuitry such as optical MAC unit 84 and gateway unit 86 is absent from ONT 70. Instead, ONT 70 simply provides physical layer conversion of optical signals to electrical signals in the downstream direction and electrical signals to optical signals in the upstream direction. Consequently, ONT 70 extends the optical network over cable 74 by generating physical (PHY) layer signals that are representative of the optical signals. In the case of GPON, for example, ONT 70 may be viewed as extending GPON over copper.

Because subscriber gateway device 72 is responsible for data layer processing, the interconnections with subscriber devices 36 are made within the subscriber premises between subscriber gateway device 72 and subscriber devices 36, such as telephone 36A, computer 36B, and television 36C. Consequently, multiple, direct interconnections are not required between the subscriber devices 36 within the subscriber premises and the ONT 70 outside the subscriber premises. Instead, ONT 70 may communicate with the subscriber devices 36 using subscriber gateway device 72 as an intermediate device, thus allowing a single through-wall connection between ONT 70 and subscriber gateway device 72. Moreover, having ONT 70 located outside of the subscriber premises allows fiber management to be performed outside of the subscriber premises, thus reducing, and possibly eliminating, the need for the technician to enter into the premises to manage the fiber link.

Although not illustrated in FIG. 5 for simplicity, ONT 70 and subscriber gateway device 72 may include a number of other components. For example, ONT 70 may include a power supply that receives power from a UPS located within the subscriber premises over cable 74. In some instances, the UPS may be integrated within subscriber gateway device 72 as described in more detail with respect to FIGS. 10A-10C.

Figure 6:
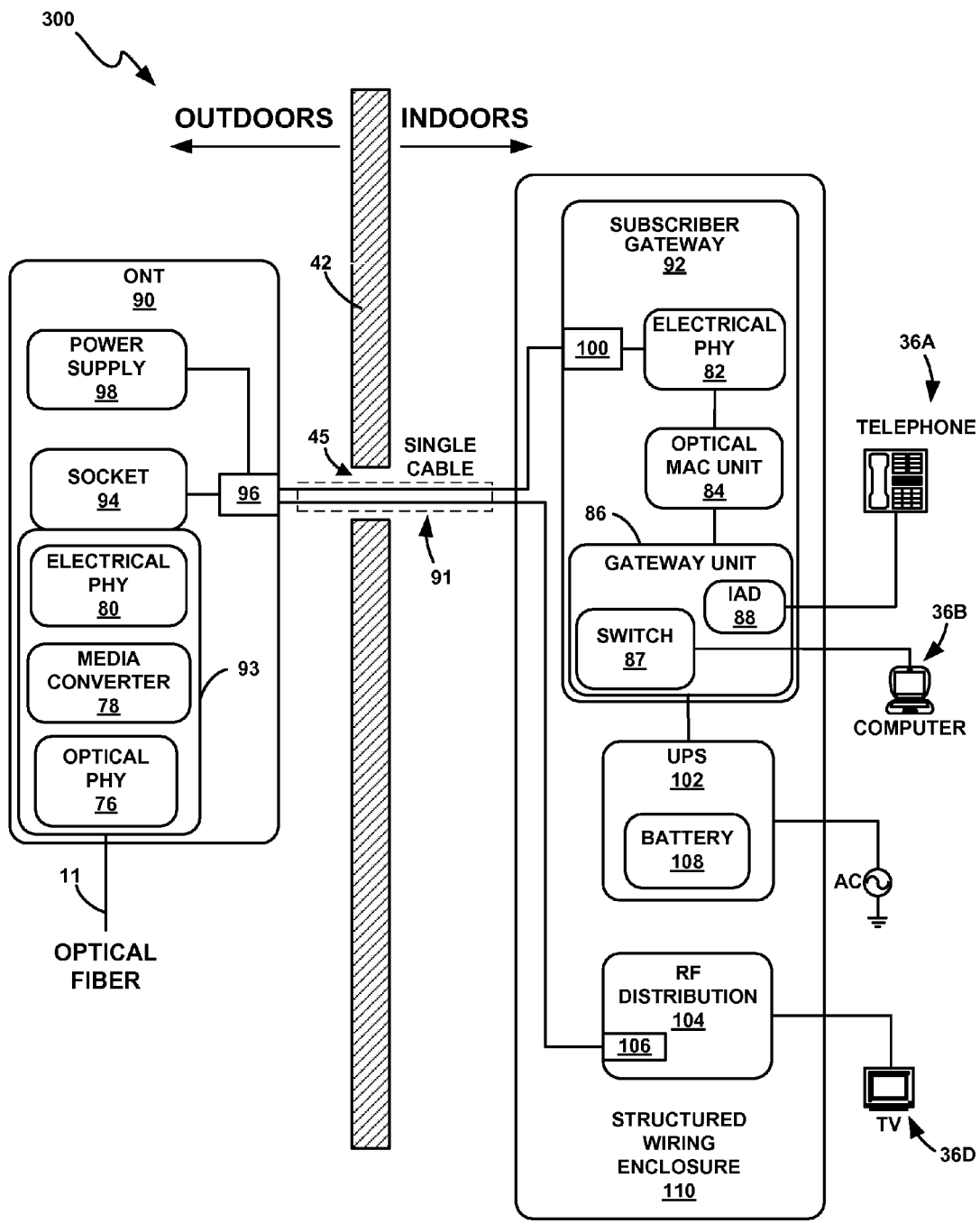
FIG. 6 is a block diagram illustrating a system in which gateway and MAC layer functions typically performed by an ONT are relocated to a subscriber gateway device.

FIG. 6 is a block diagram illustrating a system in which gateway and MAC layer functions typically performed by ONT 90 are relocated to subscriber gateway device 92. In other words, data layer processing circuitry such as optical MAC unit 84 and gateway unit 86 are absent from ONT 90. Instead, ONT 90 simply provides physical layer conversion of signals sent and received via optical fiber 11. MAC layer and gateway functionality is relocated to subscriber gateway device 92. Consequently, ONT 90 generates electrical physical (PHY) layer signals representing the optical signals received via optical fiber 11, thereby extending the optical network over an electrical metallic framework.

ONT 90 sends upstream optical signals and receives downstream optical signals via optical fiber 11. ONT 90 also sends upstream electrical signals and receives downstream electrical signals via single cable 91, which penetrates a wall 45 of the subscriber premises to couple ONT 90 to subscriber gateway device 92. Cable 91 may form a high speed electrical link between ONT 90 located outdoors and subscriber gateway device 92 located indoors within the subscriber premises. ONT 90 may also couple to other devices and/or components within the subscriber premises via cable 91. In the example embodiment illustrated in FIG. 6, ONT 90 also couples to an RF distribution circuit 104 and an uninterruptible power supply (UPS) 102 either directly or indirectly via cable 91.

Subscriber gateway device 92, UPS 102 and RF distribution circuit 104 may be housed in a structured wiring enclosure 110 mounted on or within an interior surface of wall 42. Structured wiring enclosure 110 may also include a number of other devices and/or components. In some instances, cable 91 may be a single cable that provides a single though-wall connection between ONT 90 and the components of structured wiring enclosure 110 (i.e., subscriber gateway device 92, UPS 102 and RF distribution circuit 104 in the example of FIG. 6). In other embodiments, more than one cable may be used to couple ONT 90 to the components of structured wiring enclosure 110.

ONT 90 includes a pluggable optical module 93, a socket 94, a connector 96 and a power supply 98. Pluggable optical module 93 provides O/E conversion and E/O conversion for transfer of data upstream and downstream on optical fiber 11. Pluggable optical module 93 may include an optical PHY component 76, a media converter 78 and an electrical PHY component 80. Optical PHY component 76 and electrical PHY component 80 provide interfaces for transmitting and receiving optical signals over optical fiber 11 and electrical signals over cable 91, respectively. Media converter 78 converts, in the downstream direction, the optical signals received by optical PHY component 76 into drive signals for driving electrical PHY component 80 to transmit electrical PHY signals to subscriber gateway device 92 and/or RF distribution circuit 104. Likewise, media converter 78 converts, in the upstream direction, the electrical signals received by electrical PHY component 80 from subscriber gateway device 92 and/or RF distribution circuit 104 into drive signals for optical PHY component 76 to transmit optical signals.

Pluggable optical module 93 may include several components for transmission of optical signals, such as a laser diode, a laser diode driver, and course wave division multiplexing (CWDM) optics. For reception of optical signals, pluggable optical module 93 may include CWDM optics, a photosensor diode, a transimpedance amplifier, and a limit amplifier. Pluggable optical module 93 may also include several components for transmitting and receiving electrical signals, such as a voltage source, a voltage source driver, a cable equalizer, a voltage sensor, a modulator, a demodulator or other electrical components. Optionally, pluggable optical module 93 may further include RF video O/E conversion circuitry for reception of downstream optical signals carrying RF video for delivery of video services to subscriber devices, such as television 36C. Optical PHY component 76, media converter 78 and electrical PHY component 80 may be implemented using one or more of the various components described above. As one example, optical PHY component 76 may include at least the laser diode and the photosensor, media converter 78 may include at least the laser diode driver, the transimpedance amplifier and the limit amplifier, and the electrical PHY component 80 may include at least a voltage sensor and a cable equalizer.

Pluggable optical module 93 may be removably plugged into a socket 94. Hence, pluggable optical module 93 is not soldered on to a printed circuit board (PCB) of ONT 90. Instead, pluggable optical module 93 may be removable from ONT 90. Specifically, pluggable optical module 93 is removably connected to socket 94, which may be permanently mounted on a PCB (not shown in FIG. 6) of ONT 90 along with other components of ONT 90. Accordingly, ONT 90 may be modified to support different optical network protocols, such as BPON, GPON, GEPON, or active Ethernet, by simply swapping pluggable optical module 93 out of socket 94. Pluggable optical module 93 can therefore be easily replaced after ONT 90 is mounted on wall 42 with another optical module configured to provide a different optical network protocol. In this manner, ONT 90 can be readily upgraded to support newly available optical transport protocols.

Socket 94 may include a connector (not shown in FIG. 6), with electrical contacts that mate with corresponding contacts of pluggable optical module 93. In some embodiments, the connector may conform to a specification defined in the Small Form-factor Pluggable (SFP) Transceiver MultiSource Agreements (MSA), commonly referred to as the SFP specification. Socket 94 may have output terminals that couple to connector 96 for electrical interconnection with single cable 91.

In other embodiments, the functionality of pluggable optical module 93 and socket 94 may be implemented using a non-removable circuit permanently integrated as a component of ONT 90. In these embodiments, the optical module may be capable of supporting transmission requirements of each of the optical network protocols. In other words, the optical module includes hardware components, such as a laser diode, that are capable of meeting transmission rates, power levels, or other transmission requirements of each of the supported optical network protocols. Because the optical module may support more than one optical network protocol, there is not need to upgrade the optical module.

Figure 9A:
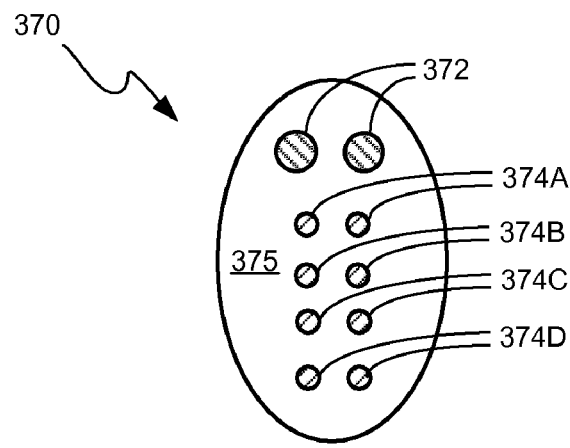
FIGS. 9A and 9B are cross-sectional illustrations of example cables that may be used to connect an ONT with a subscriber gateway device.
Figure 9B:
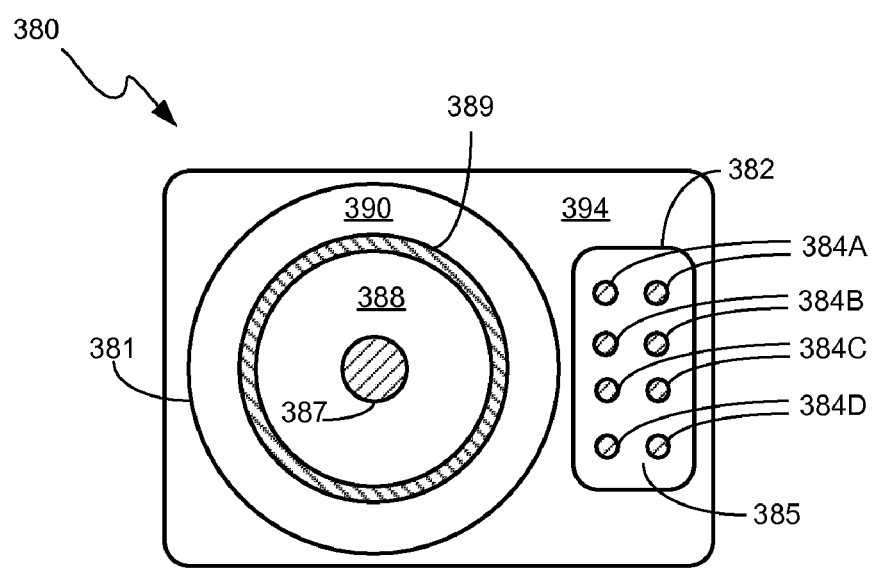

ONT 90 further includes a power supply 98 that supplies power to pluggable optical module 93 as well as any other components of ONT 90 that require power. Power supply 98 receives power from UPS 102 via cable 91. In some embodiments, cable 91 may be a CAT 5 cable and power supply 98 may receive operating power from some or all of the eight wires (4 twisted pairs) of the cable, as will be described in greater detail. In this case, power and data may be carried over the same wires using any of a variety of modulation techniques, as will be described. In other embodiments, power supply 98 may receive power from only two wires in cable 91, such as two dedicated power carrying wires, e.g., as shown in FIGS. 9A and 9B, with the other eight wires being used for data communication.

In the example illustrated in FIG. 6, the gateway and MAC layer functions typically performed by ONT 90 are relocated to subscriber gateway device 92. ONT 90 includes an electrical PHY component 82, an optical MAC unit component 84 and a control unit 50. Electrical PHY component 82 couples to cable 91 via connector 356. In this manner, cable 91 extends between connector 308 of ONT 90 and connector 100 of subscriber gateway device 92. Electrical data signals converted from optical signals by pluggable optical module 93 may traverse cable 91 from connector 96 of ONT 90 to connector 100 of subscriber gateway device 92 using any high speed serial transmission standard, such as RS485, Firewire, USB, 10GigE, 1GigE, Fast Ethernet, ATM or SONET. Connectors 96 and 100 may, for example, comprise a Serial Gigabit Media Independent Interface (SGMII) connector, a 1000 BASE-T interface connector, a 1000 BASE-TX interface connector or other interface connector depending on the transmission standard used over cable 91.

Electrical PHY component 82 provides an interface for transmitting and receiving the electrical signals, e.g., in the form of raw bits, over cable 91. Electrical PHY component 82 may include physical layer circuitry that supports processing of PHY layer signals from ONT 90. Electrical PHY component 82 may include circuitry for transmitting and receiving electrical signals via cable 91, such as a voltage source, voltage sensor, modulator, demodulator or the like. Electrical PHY component 82 may also include a serializer-deserializer which supplies the received data in parallel form via a framer to optical MAC unit 84. In the reverse direction, the physical layer circuitry of electrical PHY component 82 may generate a similar serial data signal carried by cable 91 to connector 96 of ONT 90.

Optical MAC unit 84 may convert PHY layer signals to distinct data units, such as Ethernet frames, ATM cells, or other types of data units, in the downstream direction, as well as convert these distinct data units to physical layer signals in the upstream direction. Optical MAC unit 84 may also provide addressing and channel access control mechanisms that enable several subscriber devices, e.g., subscriber devices 36, to share a given data link, such as cable 91 and optical fiber 11. Thus, optical MAC unit 84 implements at least a portion of functions of the data link layer, or layer 2, of the OSI model typically performed by ONT 90. In this manner, data layer processing circuitry such as an optical MAC unit 84 is absent from ONT 90 and relocated to subscriber gateway device 92. Instead, ONT 90 simply provides a physical layer E/O conversion of optical signals sent and a physical layer O/E conversion of optical signals received via optical fiber 11. Consequently, ONT 90 generates PHY layer signals.

Optical MAC unit 84 may be configurable to support more than one optical network protocol as described above in detail with respect to FIGS. 3 and 4. Optical MAC unit 84 of subscriber gateway device 72 may be selectively configured using a plurality of MAC configurations that each correspond to a different optical network protocol. In some instances, optical MAC unit 84 may be implemented using a configurable processing element, such as an FPGA. However, optical MAC unit 84 may be a microprocessor, a DSP, an ASIC or an ASSP. Optical MAC unit 84 may be automatically configured or remotely configured by a network administrator using a management system or provisioning system or a technician on site.

Optical MAC unit 84 provides the data units, e.g., frames, to gateway unit 86, which distributes the data units to the appropriate one of subscriber devices 36 or UPS 102 in accordance with the addressing information within the data units. As described above, gateway unit 86 may include IAD 88 and switch 87 that couple to one or more analog telephone lines and data lines, respectively. A variety of subscriber devices 36 may be coupled to subscriber gateway device 92 via the telephone lines and data lines. For example, one or more telephones 36A may be coupled to subscriber gateway device 92 via IAD 88 and the telephone lines. Similarly, one of more computers (e.g., computer 36B), televisions, set-top boxes or the like may be coupled to subscriber gateway device 92 via switch 87 and the data lines.

IAD 88 and switch 87 of gateway unit 86 may examine the addressing information of the data units to determine whether to forward the data units to one or more subscriber devices coupled to IAD 88 or switch 87. If the address of the data unit matches an address of telephone 36A supported by IAD 88, then IAD 87 provides the data unit to telephone 36A. For data services, if the destination address of a data unit matches the address of one of the subscriber devices 36 (e.g., computer, television or set-top box) served by switch 87, then switch 87 may select the appropriate port on which to forward the data unit. The addressing information analyzed by IAD 88 and switch 87 may include MAC address information, IP address information or the like. In this manner, gateway unit 86 performs the gateway functions typically performed by ONT 90.

Alternatively, or additionally, gateway unit 86 may extract information packet, such as Internet Protocol (IP) packets, from the MAC layer data units and inspect IP destination addresses of the IP packets. If the IP destination address does not correspond to IP addresses of subscriber gateway device 92 or UPS 102, or any subscriber device 36 coupled to subscriber gateway device 92, then the packet is rejected, e.g., discarded. If the IP destination address matches the IP address of the subscriber gateway device 92 or UPS 102, or a subscriber device 36 coupled to subscriber gateway device 92, then the packet is either processed locally or sent to the respective destination device. Packets addressed to UPS 102, e.g., packets to obtain configuration commands, status configuration commands or the like, are sent by gateway unit 86 to UPS 102. Packets addressed to IAD 88 or a telephone 36A supported by IAD 88, are provided to IAD 88 for further processing. For data services, if the destination IP address of a packet matches the IP address of one of the subscriber devices (e.g., computer 36B) served by switch 87, then the subscriber gateway device forwards the packet to switch 87. Switch 87 may then resolve the IP address against a MAC address of one of the subscriber devices 36 to select the appropriate port for forwarding of the packet.

Thus, optical MAC unit 84 may convert the PHY layer signals from ONT 90 into data units, such as Ethernet frames for example, and process most of the data units locally. Data units addressed to UPS 102 may be communicated to UPS 102 for further processing. Data units addressed to subscriber gateway device 92, switch 87 or IAD 88, or any subscriber devices 36 coupled to switch 87 or IAD 88 may be processed locally within subscriber gateway device 92 to extract IP packets. Subscriber gateway device 92 then forwards the data units to IAD 88 and switch 87, as appropriate, for delivery to subscriber devices 36 to support voice and data services, respectively.

With further reference to FIG. 6, socket 94 may include an optional RF video output that couples to connector 96 for transmission via a conductor, e.g., coaxial cable conductor, of single cable 91. Accordingly, in embodiments where RF video may be received via fiber 11 using an optical overlay, as is done in BPON and GPON, an RF video signal is separately transmitted by pluggable optical module 93 to RF distribution module 104 via the appropriate conductor of cable 91. For example, cable 91 may include a dedicated coaxial equivalent, e.g., as shown in FIG. 9B, that extends from connector 96 of ONT 90 to connector 106 of RF distribution module 104. Alternately, in embodiments where video information is in packet form, RF distribution module 104 may receive video information as physical layer data signals via subscriber gateway device 92 instead of directly from ONT 90 or RF distribution module 104 may be eliminated and switch 87 may forward video information to a set top box.

Because data is transmitted from ONT 90 as PHY layer signals, a single cable can be used to transmit data to support multiple services, such as voice and data services, in contrast to the use of dedicated telephone cables and data cables. This aspect can simplify the deployment of ONTs by reducing the number of cables, wiring runs and penetrations required for ONT installation. In some embodiments, a single cable carrying multiple conductors may be used to accomplish interconnection of ONT 90 to subscriber gateway device 92, or subscriber gateway device 92 and RF video distribution circuitry 104. In each case, the result is simplified installation that may be less costly and less time consuming and may better preserve aesthetics of the exterior of wall 42 of the subscriber premises.

Separation of optical MAC unit layer and gateway functionality from ONT 90 may be advantageous in that it may facilitate ready reconfiguration of ONT 90 to support a variety of optical network protocols without the need for substantial modifications to the MAC and gateway components. In this manner, the ONT can be made more flexible. Rather, the gateway components may remain substantially intact, while the MAC layer unit may be reconfigured to support a different optical network protocol, e.g., by selecting a different configuration or overwriting the current configuration stored in memory (not shown) accessed by optical MAC unit 54, e.g., FPGA circuitry. Accordingly, there is generally no need to completely replace an ONT circuit board or other components. Rather, changes necessary to support a new optical network protocol may be accomplished by replacing pluggable optical module 93 and reconfiguring MAC unit 84.

Figure 7:
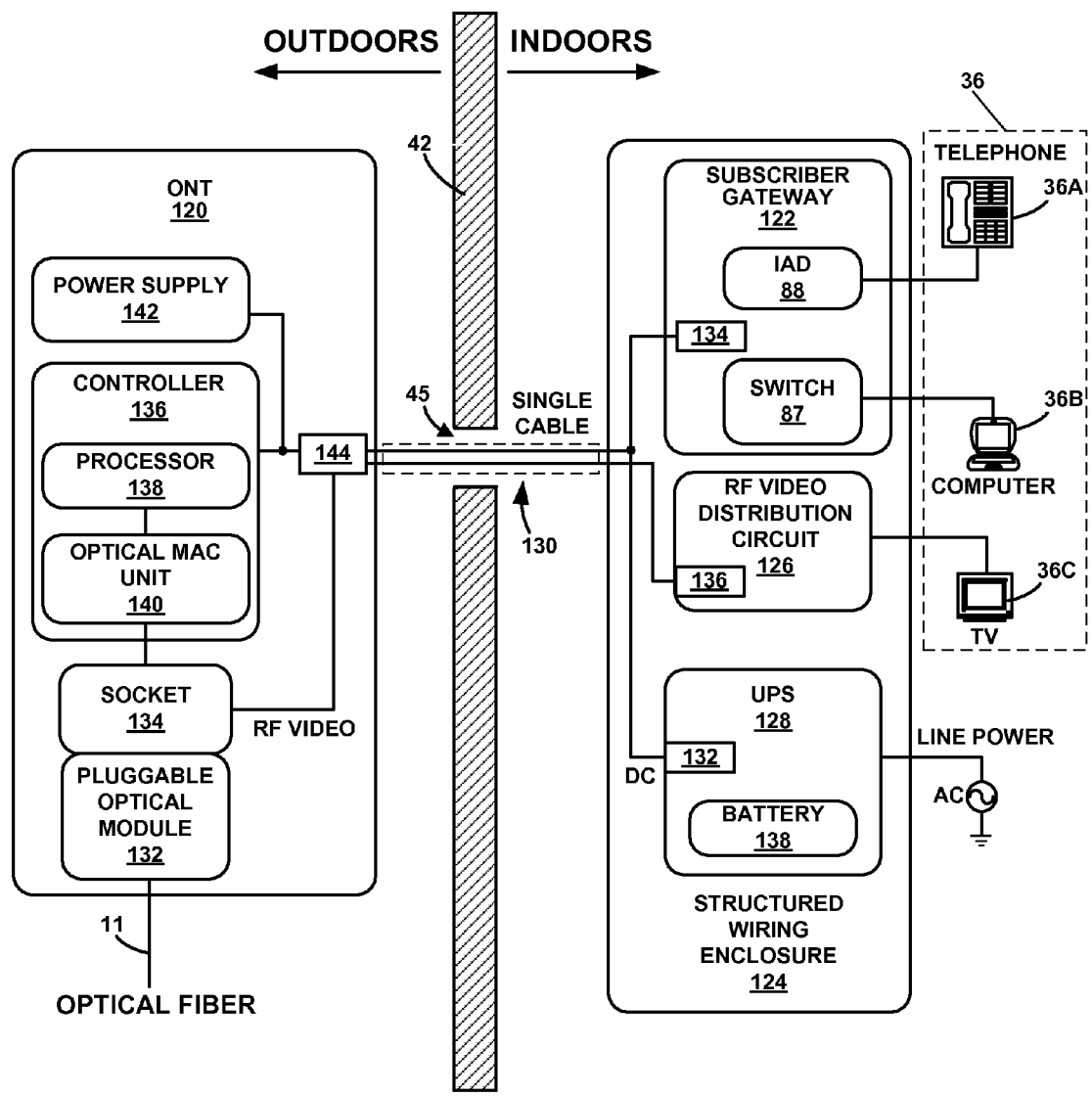
FIG. 7 is a block diagram illustrating a system in which gateway functions typically performed by an ONT are relocated to a subscriber gateway device in accordance with an embodiment of this disclosure.

FIG. 7 is a block diagram illustrating a system in which gateway functions typically performed by ONT 120 are relocated to subscriber gateway device 122 in accordance with one embodiment of this disclosure. ONT 120 may be mounted on an exterior surface of a wall 42 of the subscriber premises, i.e., outdoors. Subscriber gateway device 122 and other devices may be located somewhere within the subscriber premises, i.e., indoors. In some cases, subscriber gateway device 122 may be mounted in a structured wiring enclosure 124 mounted on or within an interior surface of wall 42.

Structured wiring enclosure 124 may be provided to hold subscriber gateway device 122, RF video distribution circuit 126 and UPS 128. Subscriber gateway device 122 provides interfaces for subscriber devices 36, such as telephone 36A and computer 36B. ONT 120 connects to structured wiring enclosure 124, which contains subscriber gateway device 122, RF distribution 126 and UPS 128 using cable 130, which provides a single through-wall connection between ONT 120 and the components of structured wiring enclosure 124.

As shown in FIG. 7, ONT 120 includes a pluggable optical module 132, a socket 134, a controller 136 with a processor 138 and an optical MAC unit 140, a power supply 142 and a connector 144. ONT 120 sends upstream optical signals and receives downstream optical signals via optical fiber 101. ONT 120 may send and receive upstream and downstream electrical signals via cable 130, which penetrates a wall 42 of the subscriber premises. ONT 120 may also receive power via cable 130. Incoming digital signals on optical fiber 11 are converted to MAC layer information frames or packets, such as Ethernet packets, using optical MAC unit 140 of controller 136. Optical MAC unit 140 may be incorporated within a controller 136, which may be formed in part by an integrated circuit (IC) that includes, for example, one or more microprocessors, DSPs, FPGAs, ASICs and/or ASSPs.

Controller 136 implements MAC functions via processor 138 and optical MAC unit 140 for transfer of data over fiber 11. For example, processor 138 may be connected to optical MAC unit 140 to control the operation of optical MAC unit 140 and monitor its status. Processor 138 may set up optical MAC unit 140 for operation in conformance with an optical network protocol. The optical network protocol may be selectively identified to processor 138, e.g., via a configuration command. In particular, upon receipt of a configuration command, which may be received over optical network 10 or manually entered into ONT 120 by a technician, processor 138 configures optical MAC unit 140 to support a desired optical network protocol, such as BPON, GPON, GEPON protocol, active Ethernet, or the like. For example, processor 138 may reconfigure an FPGA associated with optical MAC unit 140 to support the optical network protocol.

In other embodiments, processor 138 may automatically detect the optical network protocol of optical network 10, e.g., without receiving input from a network administrator or technician, and configure optical MAC unit 140 to operate in accordance with the detected optical network protocol. Processor 138 may automatically detect the optical network protocol based on a receive bit rate of the optical signal or some identifier of the optical network protocol. Alternatively, processor 13 may configure optical MAC unit 140 to operate in accordance with different optical network protocols until optical MAC unit 140 is configured to operate in accordance with the appropriate optical network protocol. In other embodiments, optical MAC unit 235 may configure itself automatically or in response to a command. In this case, controller 136 may not include a separate processor 138 as described in detail above.

Using optical MAC unit 140, processor 138 processes incoming electrical signals generated by pluggable optical module 132. In particular, optical MAC unit 140 converts the electrical signals into MAC layer signals, e.g., packets or frames, and directs the MAC signals downstream to subscriber gateway device 122, RF distribution circuit 126 and/or UPS 128, all of which may be located within structured wiring enclosure 124 inside the subscriber premises.

RF video is received via fiber 11 separately from the digital signal, e.g., using an optical overlay, as is done in BPON and GPON. The video wavelength (e.g. 1550 nm) could be separated from the digital wavelengths using a coarse wavelength-division multiplexing (CWDM) filter and delivered to a video receiver, or through a triplexer module with RF video for conversion to an electrical RF signal. The electrical RF signals may be sent via an additional conductor in cable 130 to RF distribution circuit 126. For example, cable 130 may include a dedicated coaxial equivalent, e.g., as shown in FIG. 9B.

ONT 120 includes pluggable optical module 132, which provides O/E conversion and E/O conversion for transfer data upstream and downstream on optical fiber 11. Pluggable optical module 132 may be removably plugged into socket 134. Hence, pluggable optical module 132, which may include a laser and a photosensor for transmission and reception of optical signals, respectively, is not soldered on to a printed circuit board (PCB) of ONT 120 including processor 138 and optical MAC unit 140. Instead, pluggable optical module 132 may be removable from ONT 120. Specifically, pluggable optical module 132 is removably connected to socket 134, which may be permanently mounted on a PCB (not shown in FIG. 3) of ONT 120, along with controller 136. Socket 134 may include a connector (not shown in FIG. 3), with electrical contacts that mate with corresponding contacts of pluggable optical module 132. In some embodiments, the connector may conform to a specification defined in the SFP specification. Socket 134 may have output terminals that coupled to controller 136 and an optional RF analog video output that separately couples to connector 144 for electrical interconnection with single cable 130.

Pluggable optical module 132 may include several E/O conversion circuitry components for transmission of optical signals, such as a laser diode, a laser diode driver, and CWDM optics. For reception of optical signals, example O/E conversion circuitry components of pluggable optical module 132 may include the CWDM optics, a photosensor diode, a transimpedance amplifier, and a limit amplifier. Optical MAC unit 140 converts upstream MAC layer data and voice signals to drive signals to control the laser driver, and converts downstream data and voice signals to MAC layer data and voice frames for delivery to subscriber devices 36 within the subscriber premises. Optionally, pluggable optical module 132 may further include RF video O/E conversion circuitry for reception of downstream optical signals carrying RF video for delivery of video services to subscriber devices, such as televisions.

The above components of pluggable optical module 132 may be configured appropriately for a selected optical network protocol. Accordingly, ONT 120 may be reconfigured to support a different optical network protocol by swapping the pluggable optical module 132 and reconfiguring optical MAC unit 140 in accordance with the techniques of this disclosure. By appropriately selecting, or setting parameters of, such components in pluggable optical module 132, ONT 120 can be selectively operated in conformance with different optical transport protocols, such as BPON, GPON, GEPON, and Active Ethernet. Module 209 can be easily replaced after ONT 120 is mounted on wall 103 with another module configured to provide a different optical transport protocol. In this manner, ONT 200 can be readily upgraded to support newly available optical transport protocols.

In other embodiments, the functionality of pluggable optical module 132 and socket 134 may be implemented using a non-removable circuit permanently integrated as a component of ONT 120. In this case, the non-removable optical module may be capable of supporting transmission requirements of each of the optical network protocols. In other words, pluggable optical module 132 includes hardware components, such as a laser diode, that are capable of meeting transmission rates, power levels, or other transmission requirements of each of the supported optical network protocols. Because the optical module may support more than one optical network protocol, there may be no need to upgrade the optical module when a different optical protocol is required. Instead, ONT 120 may be reconfigured to support a different optical network protocol by reconfiguring optical MAC unit 140 in accordance with the techniques of this disclosure.

In some instances, processor 138 may control operation of optical MAC unit 140. Optical MAC unit 140 transmits electrical signals to drive the E/O conversion circuitry within pluggable optical module 132 to transmit optical signals upstream on optical fiber 11. In addition, optical MAC unit 140 receives electrical signals from the O/E conversion circuit within pluggable optical module 132 for transmission downstream to subscriber devices 36 via single cable 130 and subscriber gateway device 122. For upstream communication, optical MAC unit 235 converts data received from subscriber gateway device 204 into voice and data packets and applies the packets to pluggable optical module 132 to a laser for E/O conversion to generate optical signals. For downstream communication, optical MAC unit 140 converts electrical signals obtained from O/E circuitry in pluggable optical module 132 to MAC layer signals in the form of frames or packets bearing MAC addresses of subscriber devices 36 to which the frames are directed.

Although not shown in FIG. 7, controller 136 may include or be coupled to a memory or other storage device, such as random access memory (RAM) to store data and read only memory (ROM) to store computer software. The memory may, for example, store a plurality of MAC configurations, each associated with a different optical network protocol. In addition, although not shown in FIG. 7, ONT 120 may include, e.g., in controller 136, alternatively in pluggable optical module 132 or alternatively on separate PCBs or chips, several additional data link layer components that may be suitable to implement a data path, such as a framer, a forward-error-correction (FEC) circuit, a serializer-deserializer (SERDES), a limiting amplifier, and timing circuitry.

ONT 120 further includes a power supply 142 that supplies power to controller 136 and pluggable optical module 132. Power supply 142 receives power from UPS 128 via cable 130, which is connected between connector 132 of UPS 205 and connector 144 of ONT 120. In some embodiments, cable 130 may be a CAT 5 cable and power supply 142 may receive operating power from some or all of the eight wires (4 twisted pairs) of the cable, as will be described in greater detail. In this case, power and data may be carried over the same wires using any of a variety of modulation techniques, as will be described. In other embodiments, power supply 142 may receive power from only two wires in cable 130, such as two dedicated power carrying wires, e.g., as shown in FIGS. 9A and 9B, with the other eight wires being used for data communication. Alternatively, power may be supplied to power supply 142 from UPS 128 via a separate power cable.

Optical MAC unit 140 may be configurable for compatibility with multiple optical transmission standards. Pluggable optical module 132 may be a configurable optical interface to selectively support different optical network protocols. Pluggable optical module 132 is decoupled from optical MAC unit 140 such that optical MAC unit 140 can be reprogrammed to support a different optical network protocols after replacement of pluggable optical module 132. This allows using a different optical network protocol without modification of subscriber gateway 122 or its connections to subscriber devices 36.

In instances in which optical MAC unit 140 is not automatically configured, Controller 136 may receive configuration commands, e.g., to reconfigure optical MAC unit 140. The configuration commands may be entered locally or transmitted remotely, e.g., via a network management or provisioning system. For example, a configuration command may be transmitted from a computer connected to subscriber gateway device 122, which then transmits the configuration command to controller 136. Controller 136 may also receive configuration commands from a central office, via fiber 11 that is part of optical network 10. The configuration command may alternatively be generated by a technician locally, e.g., via an interface device such as buttset device. The configuration commands may direct reconfiguration of protocol-specific information used by optical MAC unit 140. The protocol-specific information may be stored in a memory such as a flash memory (not shown) associated with controller 136.

When optical MAC unit 140 is to be configured or reconfigured, pursuant to a configuration command, processor 138 may simply update the memory with information appropriate for a new protocol. The protocol-specific information may be transmitted by or with the configuration command or stored within memory for retrieval when reconfiguration is required. Hence, optical MAC unit 140 can be locally or remotely configured to support different optical network protocol configurations, such BPON, GPON, GEPON or active Ethernet. Moreover, in some instances, optical MAC unit 140 may be automatically configured without receiving a command. Hence, when the optical network protocol is changed, the optical MAC unit 140 may be reconfigured with or without swapping the pluggable optical module 132. Controller 136 may also receive software updates in a similar manner.

Electrical connector 144 of ONT 120 transmits and receives the electrical signals on a cable 130. Cable 130 may pass through a single penetration 45 in a wall 42 of a subscriber's premises, and may be connected indoors to various devices such as a subscriber gateway device 122, RF distribution circuit 126 and UPS 128. UPS 128 may supply power to ONT 120 and, optionally, to subscriber gateway device 122 and RF distribution circuit 126. In some embodiments, subscriber gateway device 122 and UPS 128 may be physically integrated with one another. In the example of FIG. 7, ONT 120 receives both data and power via a single electrical connector 144 connected to the single cable 130 that passes through single hole 45, and transmits data via the same connector 144. In other embodiments, more than one cable may be used.

Electrical connector 144 of ONT 120, to which cable 130 is connected, may be an industry-standard 8P8C female jack mounted on a printed circuit board (PCB) of ONT 120. Another such 8P8C female jack may also be included in each of subscriber gateway device 122, RF distribution circuit 126 and UPS 128. For example, as shown in FIG. 7, subscriber gateway device 122 has connector 134, RF distribution circuit 126 has a connector 136, and UPS 128 has a connector 132, and cable 130 is coupled (e.g., via a splitter) to each of the three connectors 132, 134 and 136. As examples, connectors 132 and 134 may include a Serial Gigabit Media Independent Interface (SGMII) connector, a 1000 BASE-T interface connector, a 1000 BASE-TX interface connector or other interface connector depending on the transmission standard used over cable 130. Connector 136 may comprise a coaxial connector and connector 144 may be a hybrid connector for transmission of the RF video signal as well as digital signals.

As described above, cable 130 may be selected to carry both data and power. For example, in some embodiments, cable 130 may be an industry-standard CAT5 cable, which includes four pairs of 24 AWG (American Wire Gauge) wire. All four pairs of 24 AWG wire may carry power over short distances in addition to data. In such embodiments, cable 130 may be a CAT5 cable to handle short range power feeds and also carry Gigabit Ethernet (GigE) data and packet video between subscriber devices that are located indoors and ONT 120 located outdoors. In other embodiments, cable 130 may include larger diameter wires for providing a power feed to ONT 120 from UPS 128. One such cable is shown in FIG. 9A, which will be discussed in greater detail below. In other embodiments, a standard coaxial cable may be used. High speed data transmission may be sent over the cable simultaneously while the core of the cable is used to transmit alternating current (ac) or direct current (dc) power from UPS 128.

Data signals traversing cable 130 are received by subscriber gateway device 122 and UPS 128. Addressing information in the data signals may be used by these devices to determine which packets are pertinent to which device. For example, packets destined for subscriber gateway device 122 include data information, such as data from the Internet and/or telephone services and UPS 128 may receive diagnostic or configuration information such as a request to perform a reliability or status, or to configure UPS settings.

Example techniques for communication between a network interface device and a UPS are disclosed in commonly-assigned, copending U.S. patent application Ser. No. 11/313,222, titled, "NETWORK INTERFACE DEVICE COMMUNICATION VIA POWER LINE," filed Dec. 20, 2005, the entire content of which is hereby incorporated by reference.

In one example, the UPS 128 may transmit data, such as a status signal or alarm signal, to ONT 120 via the power line in response to detecting a change in the status of the battery or receiving a status request from ONT 120. The status or alarm signal may include AC Fail, Battery Low, Replace Battery, or Battery Missing, as well as other status or alarm signals. Thus, in some embodiments, such signals are not sent as packet information via subscriber gateway 122.

In another example, ONT 120 may transmit a status request to UPS 128. ONT 120 may receive the status request from a central office (CO) on the optical network via optical fiber 11. Periodic status requests may be required by the CO to ensure reliability of the optical network. The UPS 128 may transmit a status/alarm signal or acknowledgement signal to controller 136 in response to receiving the status request. In this manner, in some embodiments, battery status monitoring may occur using two-way communication over a single power line.

In a further example, ONT 120 may transmit a configuration command to UPS 128. The configuration command may also be received from a CO on the optical network, or generated by a technician. The UPS 128 can be remotely configured to support different configurations, such as the availability of audible alarms. Similarly, if a service provider does not want audible alarms, this feature can be turned off remotely without the need for a service call. Furthermore, the configuration command provided to UPS 128 may include software updates.

Subscriber gateway device 122 may include an integrated access device (IAD) 88 coupled to analog telephone lines, e.g., POTS lines, and a switch 87 coupled to data lines. A variety of subscriber devices 36 may be coupled to subscriber gateway device 122 via the telephone lines and data lines. For example, one or more telephones 36A may be coupled to subscriber gateway device 122 via IAD 88 and the telephone lines. Similarly, one of more computers 36B may be coupled to subscriber gateway device 122 via switch 87 and the data lines. In some embodiments, switch 87 may be an Ethernet switch that switches packets to appropriate switch ports to support data services. IAD 88 may provide an interface between analog telephones, digital telephones and subscriber gateway device 122 to support voice services. IAD 88 also receives information from telephones and generates packets for upstream transmission over optical network 10 to support two-way voice services. Similarly, switch 87 receives information from computers to support upstream transmission over optical network 10 to support data services.

UPS 128 generates operating power for delivery via cable 130. UPS 128 may include a battery 138 or other power storage component. In some embodiments, battery 138 of UPS 128 may be selected according to a subscriber's requirements. For example, a business may use a more expensive and larger battery to maintain Internet and telephone services in the event of a power outage, whereas a home owner may use a smaller battery to maintain only telephone service in the event of a power outage. In addition, UPS 128 may receive status queries and configuration commands and transmit status replies and acknowledgements over cable 130. The status queries and configuration commands may be transmitted remotely over fiber 11, e.g., from a central office, for configuration, monitoring and maintenance of UPS 128.

In operation, pluggable optical module 132 receives optical signals representing optical network packets, and converts the optical signals to electrical signals representing the optical network packets. In the example of GPON, the optical network packets may be GPON encapsulation mode (GEM) packets containing Ethernet frames, ATM cells or other data units carrying information associated with voice, data or video services.

Optical MAC unit 140 converts the electrical signals generated by module 132 into MAC layer signals, e.g., Ethernet frames, ATM cells or other data units. Each MAC layer signal may contain one or more IP packets transmitted over fiber 11. The MAC layer signals may be generated by MAC 140 according to a standard network protocol or a non-standard network protocol for transmission over cable 130. Examples of suitable network protocols include Ethernet, ATM, HPNA, HCNA, MoCA, or HomePlug networking protocols.

Controller 136 transmits the MAC layer signals to subscriber gateway device 122, RF video distribution circuit 126 and UPS 128. Subscriber gateway device 122, RF video distribution circuit 126 and UPS 128 may extract IP packets from the MAC layer signals and inspect IP destination addresses. If the IP destination address does not correspond to IP address of the respective device 122, 126 or 128, or any subscriber device 36 represented by the device, then the packet is rejected. If the IP destination address matches the IP address of the device 122, 126 or 128, or a subscriber device 36 represented by the device, then the packet is accepted and processed. For example, UPS 128 may extract the packet contents to obtain configuration commands, status configuration commands or the like.

Subscriber gateway device 122 may examine the IP address of the packet to determine whether to forward it to IAD 88 or switch 87. If the IP address matches an IP address of either IAD 88 or a telephone supported by IAD 88, then subscriber gateway device provides the packet to IAD 88 for further processing. For data services, if the destination IP address of a packet matches the IP address of one of the subscriber devices (e.g., computers) served by switch 87, then the subscriber gateway device forwards the packet to switch 87. Switch 87 may then resolve the IP address against a MAC address of one of the subscriber devices 36 to select the appropriate port for forwarding of the packet.

In various embodiments, as mentioned above, data may transferred over cable 130 in conformance with any predetermined protocol suitable for transferring data over short distances on electrical cables, such as gigabit Ethernet (GigE), 10GE, Firewire, HomePNA and MoCA. In other embodiments, optical MAC unit 140 and subscriber gateway device 122 may transfer data over cable 130 using, for example, a predetermined protocol based on the HomePNA 3.1 specification available from the HOME Phoneline Networking Alliance or alternatively based on the MoCA MAC/PHY v1.0 specification available from Multimedia over Coax Alliance. Accordingly, the above-described ONT MAC 140 of controller 136 and a MAC unit associated with subscriber gateway device 122 may be designed in compliance with such a predetermined protocol.

Figure 8:
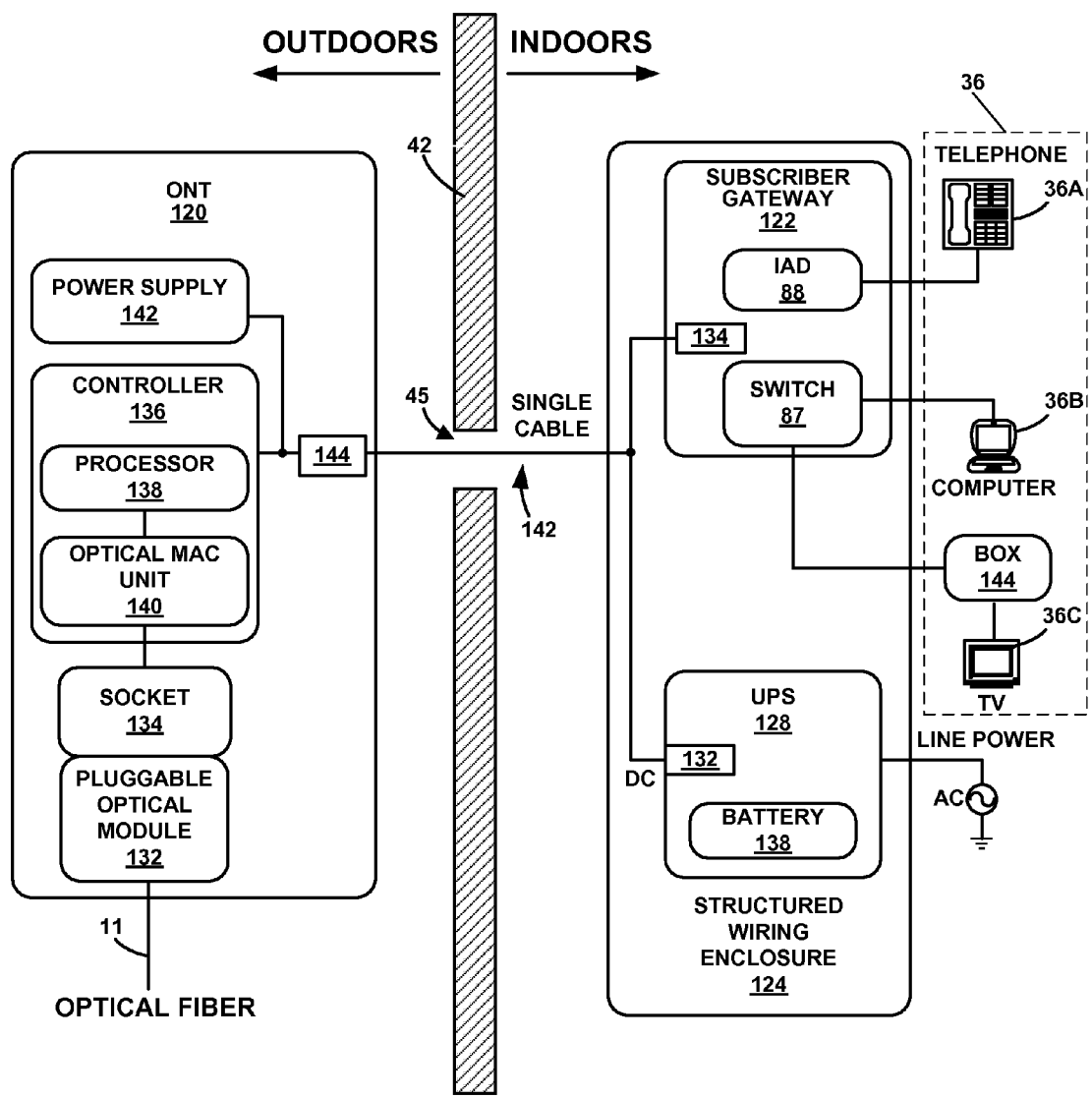
FIG. 8 is a block diagram illustrating a system that is substantially similar to the system of FIG. 7, except that the system of FIG. 8 utilizes packet video instead of RF video.

FIG. 8 is a block diagram illustrating a system, which is substantially similar to system of FIG. 7, except that the system of FIG. 8 utilizes packet video instead of RF video as in FIG. 7. For brevity, in light of the similarities between the systems in FIGS. 7 and 8, details regarding the system of FIG. 8 already described with respect to FIG. 7 are not redundantly described.

ONT 120 sends digital signals, e.g., MAC layer signals, via cable 142 to subscriber gateway device 122 and UPS 128. Addressing information in the MAC layer signals may be used by these devices to determine which packets are pertinent to which device. For example, MAC layer signals destined for subscriber gateway device 122 include data information, such as data from the Internet and/or telephone services, digital video information destined for set-top box 144 and diagnostic or configuration information for UPS 128.

Subscriber gateway 122 receives MAC layer signals from controller 136 via cable 221 including digital video information. Subscriber gateway 122 forwards MAC layer signals including digital video information to set top box 144 via switch 87. Like set-top box 46 of FIG. 3, set-top box 144 converts the MAC layer signals to video to support video services for one or more video subscriber devices 36, such as analog or digital televisions and/or set-top boxes. Set-top box 144 may convert the MAC layer signals to any standard video signal and interface including analog signals and/or digital signals. Analog signal interfaces may include, for example, coaxial interfaces, S-video interfaces, Red, Green Blue (RGB) component video interfaces, RCA composite video interfaces and the like. Digital signal interfaces may include, for example, Digital Visual Interfaces (DVI), High-Definition Multimedia Interfaces (HDMI) and the like.

As previously mentioned, cable 142 provides the physical layer connection between ONT 120 and subscriber gateway 122 and UPS 128. Cable 142 can support transmission of not only digital signals, but also power from UPS 128 to ONT 120. In some embodiments, power may be transmitted from UPS 128 to ONT 120 using a pair of wires also used to transmit digital information. Such embodiments may require cable 142 to be short as copper wires commonly used in digital signal transmissions generally have smaller gauge size and therefore provide high resistances not suitable for power transmission. For this reason, cable 142 may include a dedicated pair of wires for power transmission. Cable 370 of FIG. 9A is one example of such a cable.

FIGS. 9A and 9B are cross-sectional illustrations of example cables that may be used to connect an ONT with a subscriber gateway device. In the example of FIG. 9A, cable 370 may support delivery of power to the ONT, delivery of UPS status information between the UPS and ONT, and delivery of high-speed data to the subscriber gateway device. Cable 370 of FIG. 9A includes a dedicated pair of wires 372 for power transmission as well as four pairs of wires 374A-374D (collectively, "pairs 374") for data transmission. For example, dedicated pair of wires 372 may be used as direct current (DC) feed wires providing power and return.

Cable 370 also includes insulator 375 to electrically isolate each of wires of pair 372 and the wires of pairs 374. Each wire may include its own insulative cladding. The wires of pair 372 may have a larger diameter than the wires of pairs 374. For example, the wires of pairs 374 may have a diameter of 20 to 28 AWG (American Wire Gauge), while the wires of pair 372 may have a diameter of 10 to 18 AWG. The wires of pair 372 may be sized larger to support power transmission. The wires of pairs 374 may be equivalent to standard networking cable, such as a CAT5 cable or a CAT6 cable.

Cable 380 of FIG. 9B includes coaxial cable 381 and data transmission cable 382. Coaxial cable 381 and data transmission cable 382 are covered by overmold 394 to form cable 380. For example, overmold 394 may be an insulator, such as a plastic overmold. Coaxial cable 381 includes unpaired wire 387 and insulating spacer 388 surrounding unpaired wire 387. Coaxial cable 381 further includes conducting sheath 389 surrounding insulating spacer 388 such that conductive sheath 389 is coaxially configured with unpaired wire 387. Coaxial cable also includes insulator 390 covering conductive sheath 389. Coaxial cable may be used to transmit RF video signals as well as AC power via unpaired wire 387 and conductive sheath 389.

Data transmission cable 382 includes four pairs of wires 384A-384D (collectively, pairs 384") for data transmission. The wires of pairs 384 may have a diameter of 12 to 18 AWG, and more preferably 14 AWG. Data transmission cable 382 further includes insulator 385 to electrically isolate each of the wires of pairs 384. Each wire of pairs 384 may include its own insulative cladding. As examples, data transmission cable 382 may comprise a CAT5 or CAT6 cable. The combination of overmold 394, insulator 390 of coaxial cable 381 and insulator 385 of data transmission cable 382 serves to electrically isolate each of unpaired wire 387 and the wires of pairs 374 from each other.

FIGS. 10A-10D are block diagrams illustrating exemplary systems for providing subscriber services via an optical network utilizing an ONT and a subscriber gateway device integrated with a UPS in accordance with various embodiments of this disclosure. The differences between the systems shown in FIGS. 10A-10D illustrate the flexibility provided by various embodiments. For example, ONT 402 is the same for each embodiment shown in FIGS. 10A-10D, but may itself be reconfigured according to different optical network protocols.

Additionally, a subscriber gateway device including only those features requested by a customer may be paired with a standard ONT. A customer may later replace or reconfigure their subscriber gateway device without modification to the ONT.

Figure 10A:
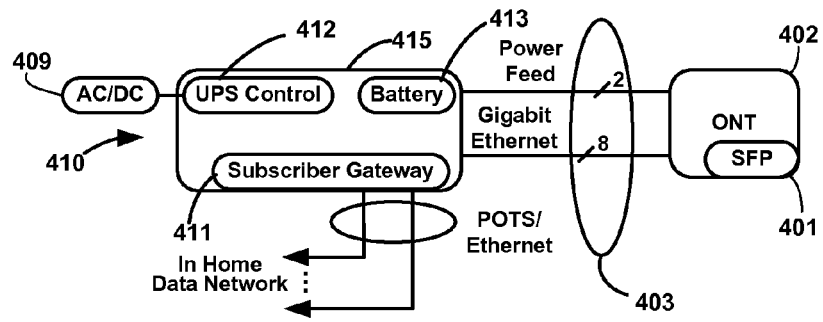
FIGS. 10A-10D are block diagrams illustrating exemplary systems for providing subscriber services via an optical network utilizing an ONT and a subscriber gateway device integrated with a UPS in accordance with various embodiments of this disclosure.

FIG. 10A illustrates a first embodiment in which a UPS control unit 412 and a subscriber gateway device 411 are physically included within the same housing 415 of a UPS 410. In the example of FIG. 10A, UPS 410 has a connector (not shown) that is connected to a single cable 403 that in turn is connected to an ONT 402. UPS 410 is also coupled to a source of AC line power 409. As an example, cable 403 may be a combined power/data cable composed of two DC feed wires (power and return) and a CAT5 cable (4-24 AWG twisted pair wires) as shown in FIG. 8. UPS 410 illustrated in FIG. 10A also includes a battery 413 which is also located within housing 415. In other embodiments, battery 413 may be located outside of housing 415. In this manner, UPS 410 provides a single point of network access to all communication devices in the in home data network of a subscriber premises. Subscriber gateway device 411 may be coupled to subscriber devices via POTS telephone lines and Ethernet connections.

Figure 10B:
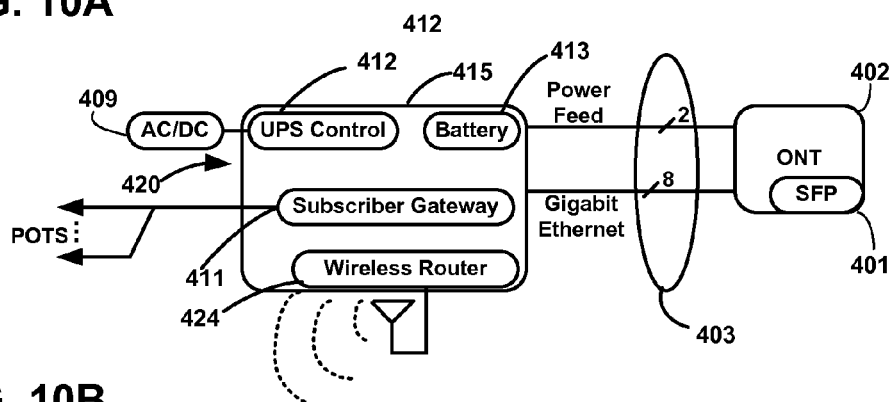

FIG. 10B illustrates UPS 420 as an alternative to UPS 410 as described above in reference to FIG. 10A. UPS 420 of FIG. 10B includes a wireless router 424 in addition to UPS control unit 412, subscriber gateway device 411 and battery 413. Wireless router 424 may serve as a wireless access point for subscriber devices in the form of computing devices within a subscriber premises to support data services. Wireless router 424 may take the place of switch 87 for at least some subscriber devices.

Figure 10C:
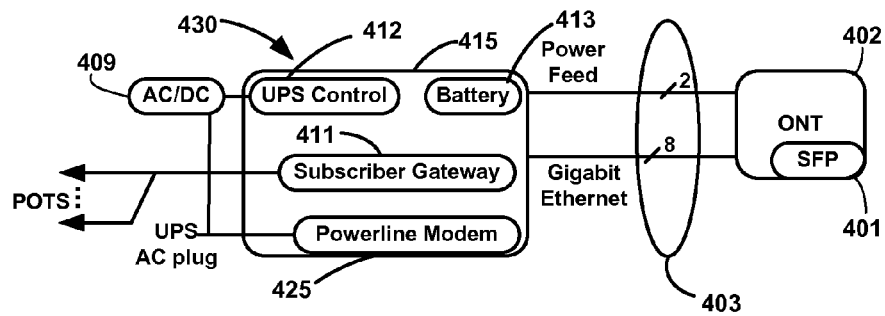

FIG. 10C illustrates UPS 430 as a third example, and as an alternative to UPS 410 and UPS 420. UPS 430 of FIG. 10C includes powerline modem 425 instead of an Ethernet connection as provided by UPS 410 or a wireless router as provided UPS 420. Powerline modem 425 sends and receives data signals via preexisting power circuits within a subscriber's premises, i.e., via in-wall electrical wiring. Hence, powerline modem 425 and UPS control unit 412 may be coupled to the same source of AC power 409.

Figure 10D:
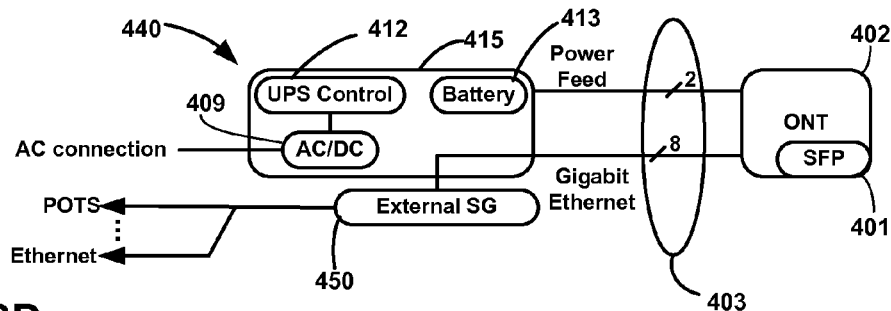

FIG. 10D illustrates UPS 440 as a fourth alternative to UPS 410, UPS 420 and UPS 430. As shown in FIG. 10D UPS 440 is substantially similar to UPS 420 of FIG. 10A except that RG device 450 is located external to UPS housing 415. RG device 450 couples to subscriber devices within the subscriber premises via POTS and Ethernet connections, and is coupled to the ONT via the UPS.

In each of the embodiments illustrated in FIGS. 10A-10D, the ONT can be configured to support BPON, GPON, GEPON or other optical network protocol. Furthermore, in all of the four embodiments, if the power and distance allow, Power over Ethernet (POE) as per the IEEE 802.3af protocol may be used to deliver both power and data via CAT5/6 cable. In alternative embodiments, a cable may include the two power wires shown in cable 403 of FIGS. 10A-10D. Cable 403 is illustrated in FIGS. 10A-10D as including gigE CAT 5 conductor for purposes of illustration. Other types of conductors may be used.

Figure 11A:
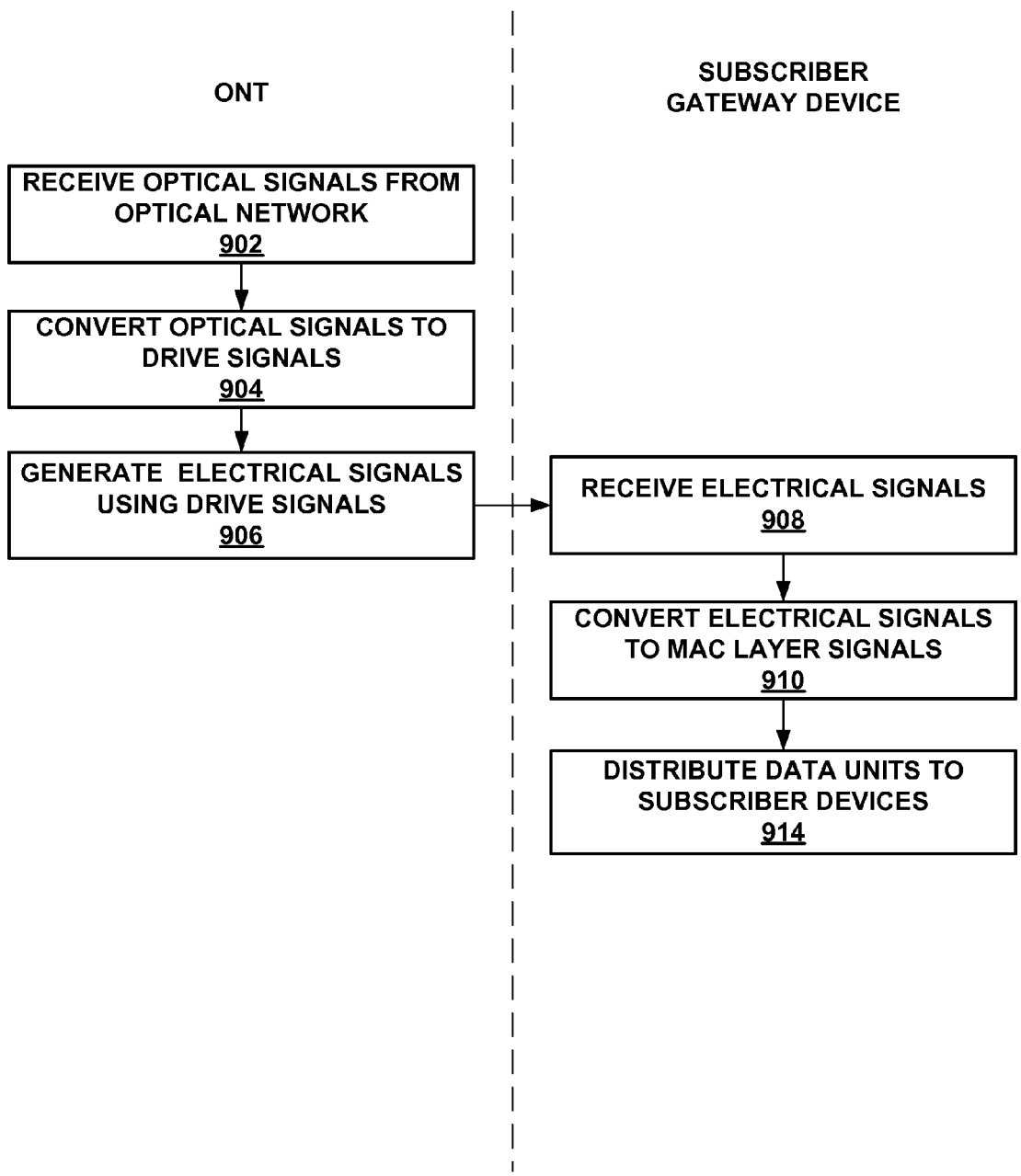
FIGS. 11A-11B are flow diagrams illustrating techniques for providing subscriber services via an optical network utilizing an ONT without a MAC unit and a subscriber gateway device including a MAC unit.
Figure 11B:
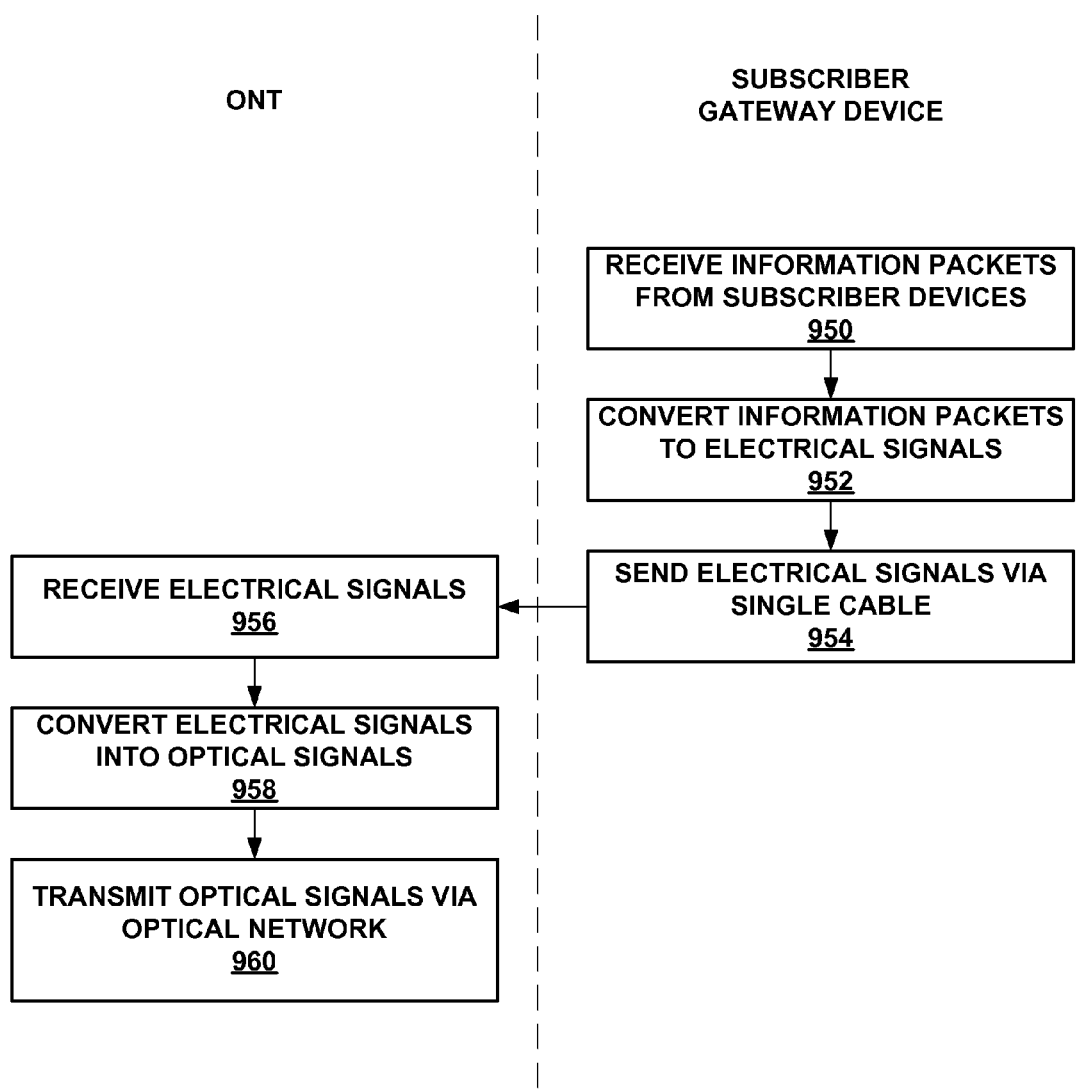

FIGS. 11A-11B are flow diagrams illustrating techniques for providing subscriber services via an optical network utilizing an ONT without a MAC unit and a subscriber gateway device including a MAC unit. More specifically, FIG. 11A illustrates techniques for downstream communications, while FIG. 11B illustrates techniques for upstream communications. For illustrative purposes, the techniques of FIGS. 11A-11B are described with respect to ONT 70 and subscriber gateway device 72 as shown in FIG. 5.

With reference to FIG. 11A, ONT 70 receives optical signals including signals that conform to one of a plurality of different optical network protocols via fiber 11 (902). For example, the optical signals may include telephone service, data service and/or video service. ONT 70 receives the optical signals with optical PHY component 76. Media converter 78 converts the optical signals to drive signals for electrical PHY component 80 (904). Electrical PHY component 80 generates electrical signals on cable 74 using the drive signals provided by media converter 78 (906).

Subscriber gateway device 72 receives the electrical PHY signals from ONT 70 via cable 74 (908). In particular, an electrical PHY component 82 of subscriber gateway device 72 receives the electrical PHY signals via cable 74. Optical MAC unit 84 receives the electrical PHY signals from electrical PHY component 82 and converts at least some of the electrical signals to MAC layer signals (910). The MAC layer signals may, for example, include data units associated with subscriber services, such as telephone voice service, data service and/or video service. In some embodiments, optical MAC unit 84 may be configurable to support different optical network protocols. For example, MAC 84 may be configurable to support two or more optical network protocols, such as BPON, GPON, GEPON and active Ethernet.

Gateway unit 86 distributes the data units to one or more subscriber devices 36 (912). For example, the data units may include voice packets and data packets. Gateway unit 86 may send the voice packets to one or more client telephone devices via one or more telephone lines, and send the data packets to one or more client computing devices via one of a network switch, a wireless router, or a power line modem.

With reference to FIG. 11B, information packets containing upstream communications from subscriber devices 36 are received by subscriber gateway device 72 (950). Subscriber gateway device 72 converts the information packets into electrical signals (952). Subscriber gateway device 72 the sends electrical signals to ONT 70 via cable 74 (954). ONT 70 receives the electrical signals (956). Optical MAC unit 84 converts the electrical signals to optical signals (958) which it transmits upstream over optical fiber 11 (960).

Figure 12A:
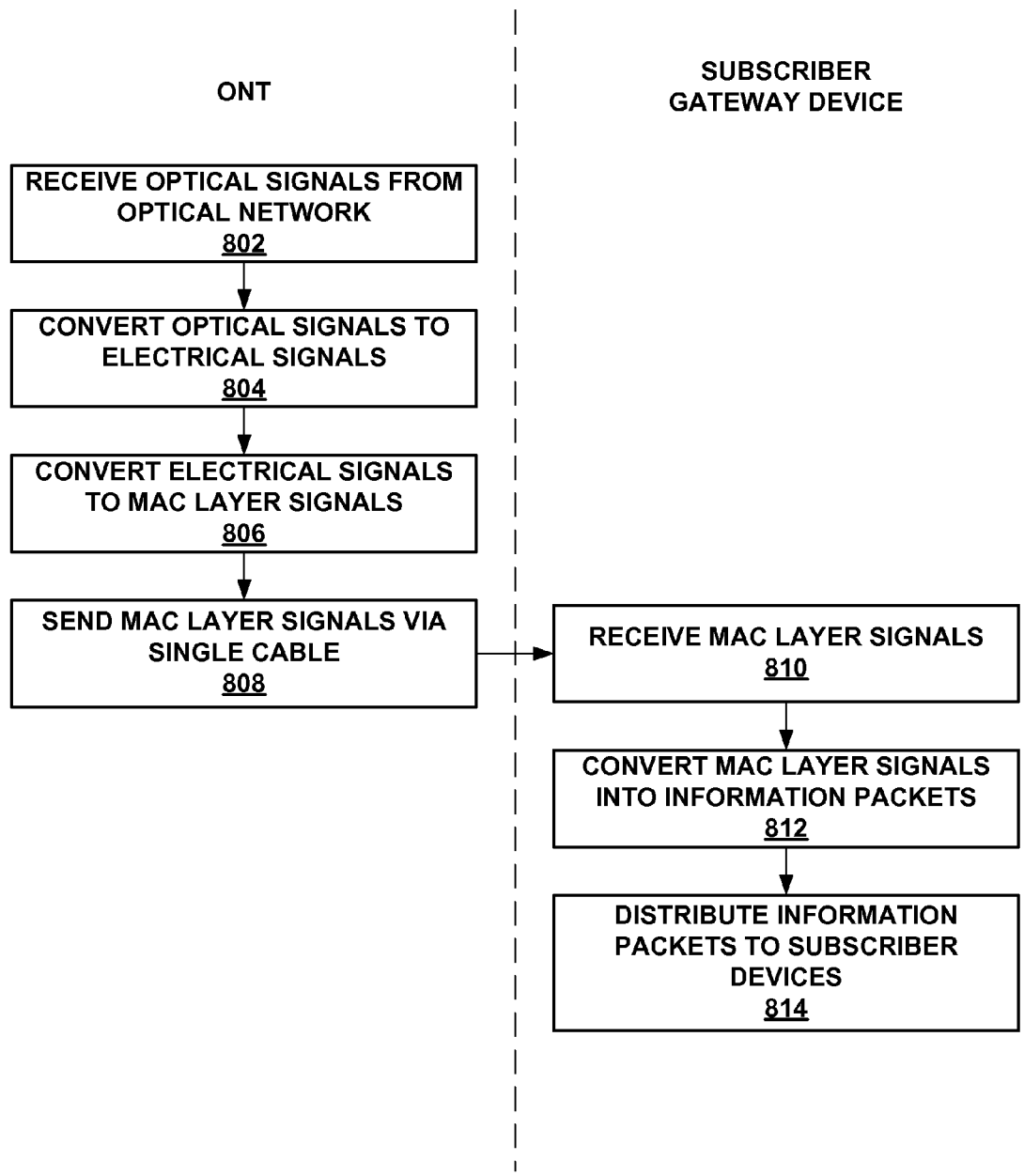
FIGS. 12A-12B are flow diagrams illustrating techniques for providing subscriber services via an optical network utilizing an ONT including a MAC unit and a subscriber gateway device.
Figure 12B:
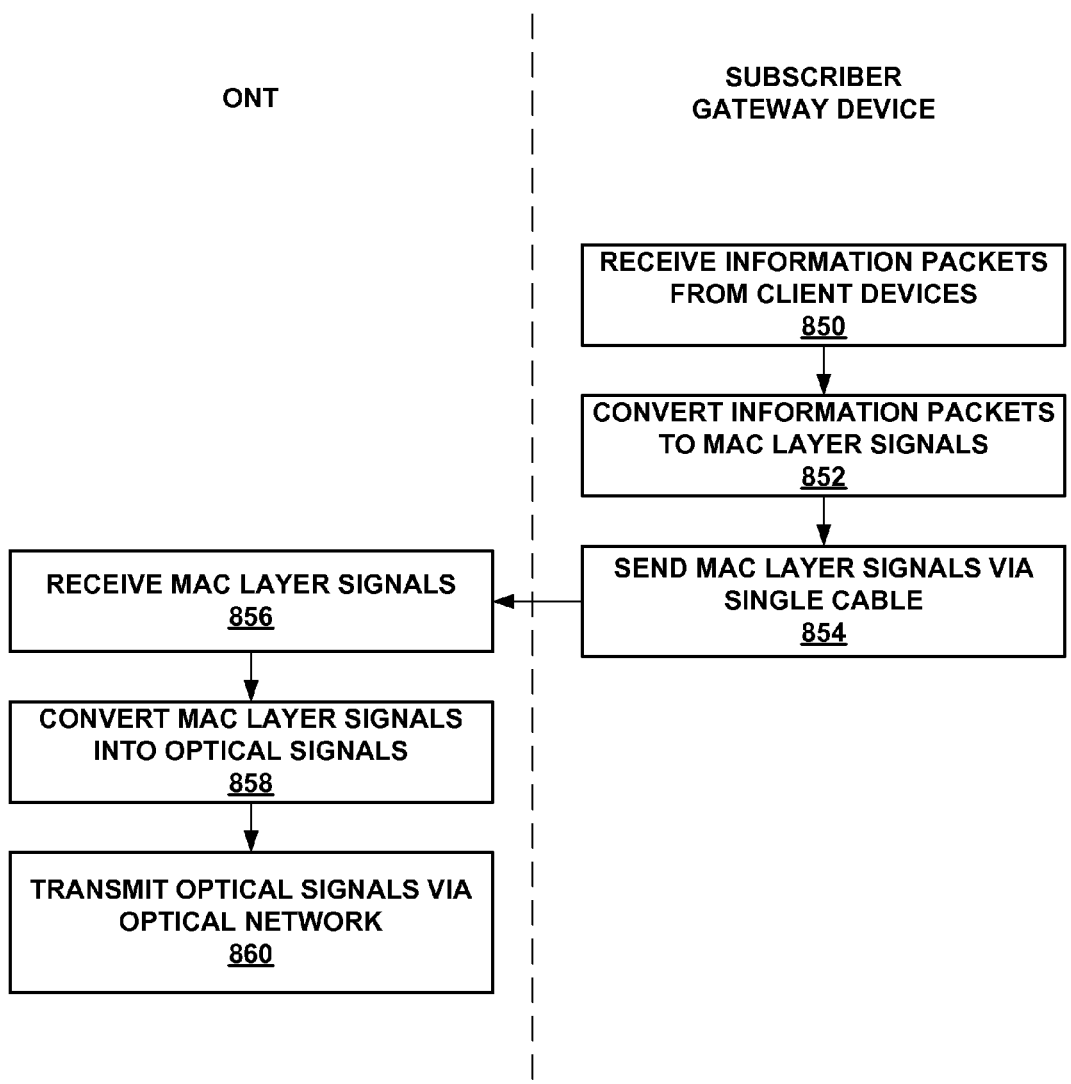

FIGS. 12A-12B are flow diagrams illustrating techniques for providing subscriber services via an optical network utilizing an ONT including a MAC unit and a subscriber gateway device. More specifically, FIG. 12A illustrates techniques for downstream communications, i.e., communications sent via the optical network though the ONT and subscriber gateway device to subscriber devices. FIG. 12B illustrates upstream communications, i.e., communications from subscriber devices. For illustrative purposes, the techniques of FIGS. 12A-12B are described with respect to the system including ONT 120 and subscriber gateway device 122 as shown in FIG. 7.

With reference to FIG. 12A, ONT 120 receives optical signals providing two or more subscriber services via fiber 11 (802). For example, the optical signals may include telephone service, data service such as Internet and/or video service. ONT 120 receives the optical signals with pluggable optical module 132, which converts the optical signals to electrical signals (804). Pluggable optical module 132 sends the electrical signals to controller 136 where MAC unit 140 converts at least some of the electrical signals to MAC layer signals comprising signals (806). The MAC layer signals may include data associated with at least two different services, such as telephone voice service, data service and/or video service. MAC unit 140 is configurable to support different optical network protocols. For example, MAC unit 140 may be configurable to support two or more optical network protocols selected from a group consisting of BPON, GPON, GEPON and active Ethernet.

Controller 136 then sends the MAC layer signals to subscriber gateway device 122 via cable 130 (808). Subscriber gateway device 122 receives the MAC layer signals (810) and converts the MAC layer signals into information packets (812). Subscriber gateway device 122 then distributes the information packets to at least two different subscriber devices 36 (814). For example, the information packets may include voice packets and data packets. Subscriber gateway device 122 may send the voice packets to one or more client telephone devices via one or more telephone lines, and subscriber gateway device 122 may send the data packets to one or more client computing devices via one of a network switch, a wireless router, or a power line modem.

In some instances, optical signals received by ONT 120 via cable 130 may incorporate RF video information. In such embodiments, controller 136 may convert at least a portion of the electrical signals received from pluggable optical module 132 to RF video signals, which are then sent via cable 130 to inside a subscriber premises to RF distribution interface 126. In other embodiments, pluggable optical module 132 may convert a portion of optical signals to RF video signals, which are sent to inside a subscriber premises to RF distribution interface 126 via controller 136 and cable 130. In either case, RF distribution 126 then distributes the RF video signals to one or more of subscriber devices 36, such as televisions via an analog video line.

With reference to FIG. 12B, information packets containing upstream communications from subscriber devices 36 are received by subscriber gateway device 122 (850). Subscriber gateway device 122 converts the information packets into MAC layer signals (852). Subscriber gateway device 122 the sends the MAC layer signals to ONT 120 via cable 130 (854). For example, the MAC layer signals may conform to a standard high speed data protocol, e.g., GigE, 10GE, Firewire, HomePNA, MoCA or the like may be used.

ONT 120 receives the MAC layer signals with controller 136 (856). Optical MAC unit 140 of controller 136 converts the MAC layer signals to electrical signals, and forwards the electrical signals to optical module 132. Optical module 132 converts the electrical signals to optical signals (858) which it transmits upstream over optical fiber 11 (860).

Figure 13:
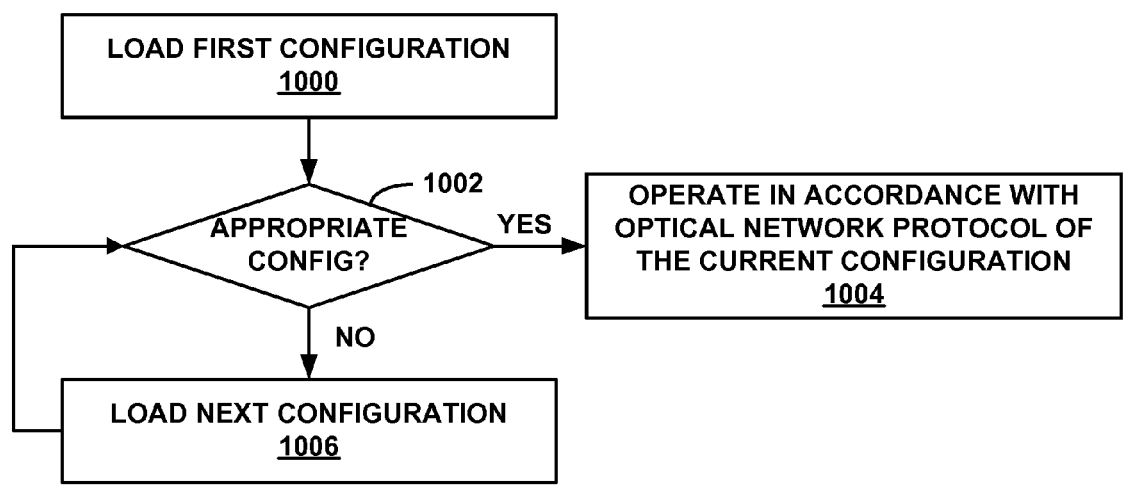
FIG. 13 is a flow diagram illustrating example automatic configuration of an optical MAC unit in accordance with one aspect of this disclosure.

FIG. 13 is a flow diagram illustrating example automatic configuration of an optical MAC unit in accordance with one aspect of this disclosure. For illustrative purposes, the techniques of FIG. 13 are described with respect to optical MAC unit 52 of FIGS. 3 and 4. However, similar techniques may be used by any of MACs 84 and 140.

Optical MAC unit 52 may load a first configuration to configure itself to support a first optical network protocol (1000). Optical MAC unit 52 may, for example, load the first configuration from memory 60 that stores a plurality of configurations that correspond with different optical network protocols. Optical MAC unit 52 may load the first configuration upon being connected to optical fiber 11 of optical network 10. Alternatively, when optical MAC unit 52 is reconfiguring itself in response to a change in optical network protocols, optical MAC unit 52 may load the first configuration upon detecting an unrecognized optical signal.

After loading the first configuration, ONT 40 determines whether optical MAC unit 52 is appropriately configured (1002). ONT 40 may determine whether the optical MAC unit 52 is appropriately configured by comparing one or more protocol transmission requirements of the loaded optical network protocol with actual transmission characteristics of optical network 10. ONT 40 may, for example, compare actual or estimates of the actual transmission rates, e.g., bit rates, with expected transmission rates of the loaded configuration, packet structure of the received optical signals with the expected packet structure and the like.

If ONT 40 determines that optical MAC unit 52 is appropriately configured, optical MAC unit 52 continues to operate in accordance with the optical network protocol of the current configuration (1004). If, however, ONT 40 determines that optical MAC unit 52 is not appropriately configured, optical MAC unit 52 loads a second configuration to reconfigure itself to support a second optical network protocol (1006). Optical MAC unit 52 continues to load different MAC configurations until ONT determines that optical MAC unit is appropriately configured to operate in accordance with the optical network protocol of the optical network to which ONT 40 is connected. In this manner, ONT 40 may implement a transport discovery protocol that allows ONT 40 to automatically discover the optical network protocol of the optical network to which ONT 40 has been connected.

Although in the example illustrated in FIG. 13, optical MAC configures itself, in other embodiments, a processor or other component of ONT 40 may configure optical MAC unit 52 in a similar manner. Automatically configuring optical MAC unit 52 may reduce the complexity of installation as the installation procedure is automatic (i.e., not manually performed by an administrator remotely or a technician on site). Moreover, the installation procedure is independent of the optical network protocol, thus simplifying technician training.

Figure 14:
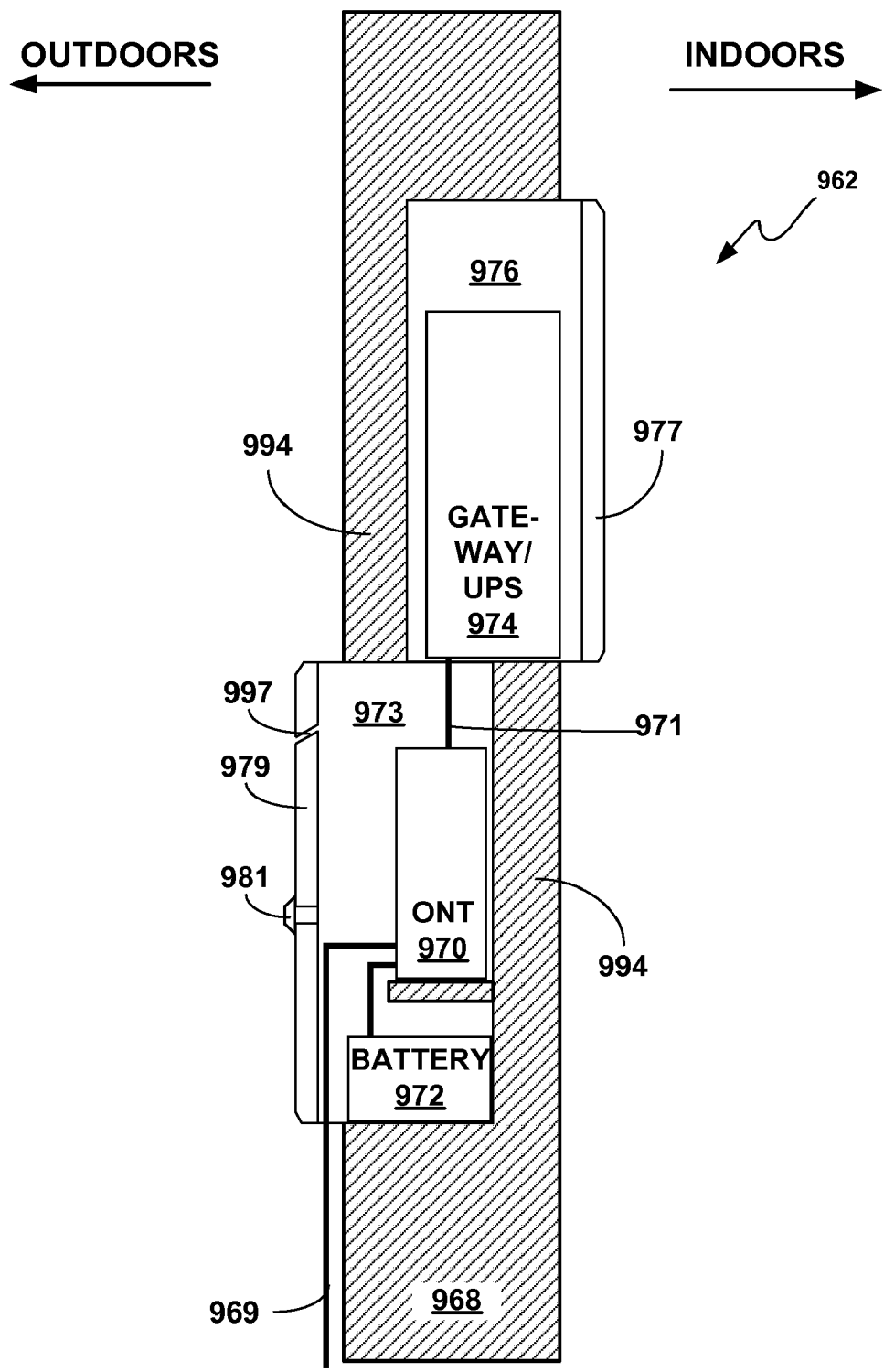
FIG. 14 illustrates an exemplary outside wall structured wiring enclosure containing integrated subscriber gateway device/UPS and ONT.

FIG. 14 illustrates an exemplary outside wall structured wiring enclosure (SWE) 962 containing integrated subscriber gateway device/UPS 974 and ONT 970. Wiring enclosure 962 includes two separate enclosures sunk within wall 968: enclosure 976, which allow interior access via panel 977 and enclosure 973, which provides exterior access via panel 979. In other embodiments, one or both of enclosures 973 and 976 may be located externally on wall 968 instead of sunken into wall 968. Enclosure 976 contains integrated subscriber gateway device/UPS 974, while wiring enclosure 973 contains ONT 970 and battery 972, which is separate from subscriber gateway device/UPS 974.

Optical fiber 969 enters enclosure 973 and terminates at ONT 970, where it is converted to an electrical signal. ONT 970 sends and receives optical communications via optical fiber 969. Enclosure 973 includes panel 979 to allow exterior access to the terminal location of optical fiber 969, e.g., by a service provider employee. Battery 972 is also located within enclosure 973 to allow exterior access to battery 972, e.g., for service or maintenance. Panel 979 includes security screw 981 to prevent unauthorized access. Other locking techniques may also be used to prevent unauthorized access. Panel 979 may also include battery vent 997 to prevent outgassing into the subscriber premises from battery 972.

ONT 970 communicates via through-wall cable 971 with integrated subscriber gateway device/UPS 974, which is located within enclosure 976. Panel 977 allows interior access to integrated subscriber gateway device/UPS 974. Integrated subscriber gateway device/UPS 974 includes connections to subscriber devices (not shown) which may also be accessed via panel 977.

Wall 968 includes insulation 994 and panels 977 and 979 may also be insulated. The temperature of battery 972 may be stabilized via thermal contact with the interior of the subscriber premises. Further, because the subscriber gateway device is located indoors, it is not subjected to wide temperature variations and can use standard components. Additionally, with the UPS located indoors, it can be used to power the subscriber gateway device as well as ONT 970, allowing one AC/DC converter to be used for both devices.

Modifications to the described embodiments may be made without departing from the scope of this disclosure. For example, ONT 202 may be implemented using multiple chips, such as a processor chip and a MAC chip that are connected to one another by conductors in a printed circuit board also connecting a mounted power supply and socket. Additionally, while cables have been described within the context of other embodiments of this disclosure, such cables may be useful in system unrelated to optical network interfaces.

Various embodiments of this disclosure may provide one or more of the following advantages. As one example, embodiments of this disclosure may provide for optical network equipment, e.g., ONTs that may be configured for multiple standards for transmitting information via an optical network. Gateway and optical terminal function may be entirely decoupled using a standard interface to connect the ONT with the subscriber gateway device, allowing different optical transports to be used where applicable (e.g. GPON for high population density, and active Ethernet for subscribers located longer distances from the CO). In this manner, optical network interfaces need not be dedicated to a single optical transmission standard, and can be readily and flexibly reconfigured without replacing MAC and gateway hardware.

As another example, using standard network interface to connect an ONT with a subscriber gateway device limits the number of through-wall connections required to provide multiple subscriber services via a PON. The standard network interface also allow adding subscriber services without running an additional through-wall connections to the exterior of a subscriber's premises for each new service, e.g., phone, television, Internet, etc.

As another example, embodiments of this disclosure may provide a centralized access point within a home for subscriber services such as phone, television and Internet. By providing a centralized access point, embodiments of this disclosure may be useful in combination with currently existing technologies that allow high-speed data transmission within a preexisting home without rewiring the home using CAT5e cable or other cable. Such technologies include wireless technologies as well as technologies that allow high-speed data transmission over preexisting phone or coaxial cables. Embodiments are also useful for new building construction applications utilizing centralized high-speed data networks (sometimes referred to as home-run wiring). The centralized access point allows in-home wiring changes to be handled in a centralized wiring location by the subscriber.

As another example, locating an ONT outside a subscriber's premises allows a service provider to access to the terminal point of the optical fiber without entering the interior of a subscriber's premises. Such access may be useful for configuration and diagnostics of the PON and/or the optical network interface itself.

Embodiments of this disclosure may reduce the size of a housing exterior to the subscriber's premises containing the electrical components of an optical network interface, which improves the aesthetic qualities of an optical network interface. For example, because multiple connections necessary to serve subscriber devices are located within a subscriber's premises, e.g., as part of a subscriber gateway device, a housing exterior to the subscriber's premises does not need to contain the hardware necessary to provide such connections.

Various aspects of this disclosure may be implemented in hardware, software, firmware, or any combination thereof. If implemented in hardware, the techniques may be realized using digital hardware, analog hardware, or both. If implemented in software, the techniques may be realized in part by a computer readable medium comprising program code containing instructions that, when executed, cause one or more processors to perform one or more of the methods described above.

A computer readable medium may comprise computer storage media such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, or the like. Alternatively, the computer readable medium may include communication media that facilitates transfer of computer program product from one place to another.

The program code may be executed by one or more processors, such as one or more digital signal processors (DSPs), general purpose microprocessors, an application specific integrated circuits (ASICs), field programmable logic arrays (FPGAs), other equivalent integrated or discrete logic circuitry, of any combination of thereof.

Depiction of different features as modules/units is intended to highlight different functional aspects of the devices illustrated and does not necessarily imply that such modules/units must be realized by separate hardware or software components. Rather, functionality associated with one or more modules/units may be integrated within common or separate hardware or software components.

Various embodiments have been described. These and other embodiments are within the scope of the following claims.

The invention claimed is:

1. A system comprising:
an optical network terminal (ONT) that converts optical signals representing information packets received from a passive optical network (PON) via an optical fiber link to electrical signals, wherein the electrical signals comprise raw bits; and
a subscriber gateway device coupled to the ONT via at least one cable, the subscriber gateway device including:
an optical media access control (MAC) unit that receives the electrical signals from the ONT via at least one pair of electrical conductors included in the cable and converts the electrical signals into MAC layer signals representing the information packets; and
a gateway unit that distributes the MAC layer signals to one or more subscriber devices,
wherein the ONT converts the optical signals received from the PON to electrical signals and transmits the electrical signals to the subscriber gateway device without performing any MAC layer functions including without converting the electrical signals into distinct data units and without providing addressing and channel access control mechanisms for transmission of the electrical signals to the subscriber gateway device.

2. The system of claim 1, wherein the ONT includes:
an optical physical layer (PHY) component that receives optical signals from the optical network;
a media converter that converts the optical signals to drive signals; and
an electrical physical layer (PHY) component that transmits the electrical signals to the subscriber gateway device in accordance with the drive signals.

3. The system of claim 2, wherein the optical PHY component, the media converter and the electrical PHY component are housed within a pluggable optical module that is removably plugged into a socket of the ONT.

4. The system of claim 1, wherein the optical MAC unit of the subscriber gateway device is selectively configurable to support a plurality of optical network protocols.

5. The system of claim 4, wherein the optical MAC unit is selectively configurable to support two or more of a broadband passive optical network (BPON), a gigabit-capable passive optical network (GPON), a gigabit-capable Ethernet passive optical network (GEPON) and an active Ethernet optical network.

6. The system of claim 4, wherein the optical MAC unit is selectively configurable to support at least one active optical network protocol and at least one passive optical network protocol.

7. The system of claim 1, wherein the gateway unit includes at least one of a switch, a wireless router, and an integrated access device to distribute the MAC layer signals to the one or more subscriber devices.

8. The system of claim 1, wherein the gateway unit extracts the information packets from the MAC layer signals and distributes the information packets to the one or more subscriber devices.

9. The system of claim 1, wherein the one or more subscriber devices include at least one of a telephone, television, computer, set-top box, wireless access point, powerline modem and router.

10. The system of claim 1, wherein the ONT is located outside a subscriber premises and the subscriber gateway device is located inside the subscriber premises, and wherein the cable penetrates at least one wall between the outside and the inside of the subscriber premises.

11. The system of claim 1, wherein the at least one cable comprises a single cable that includes a plurality of conductors including the at least one pair of electrical conductors and other conductors.

12. The system of claim 11, further comprising an uninterruptible power supply (UPS) that generates operating power for the ONT and sends the operating power to the ONT via at least one of the other conductors of the single cable.

13. The system of claim 11, further comprising a radio frequency (RF) video distribution unit coupled to the ONT via the single cable, wherein the ONT converts optical signals representing RF video to electrical signals and converts the electrical signals to RF video signals, wherein the RF video distribution unit receives the RF video signals from the ONT via at least one coaxial conductor included in the single cable.

14. A method comprising:
receiving, with an optical network terminal (ONT) that is connected to a passive optical network (PON) via an optical fiber link, optical signals representing information packets via the optical fiber link;
converting, with the ONT, the optical signals to electrical signals, wherein the electrical signals comprise raw bits;
sending the electrical signals from the ONT to a subscriber gateway device coupled to the ONT via at least one pair of electrical conductors included in at least one cable without performing any media access control (MAC) layer functions with the ONT, including without converting the electrical signals into distinct data units and without providing addressing and channel access control mechanisms for transmission of the electrical signals to the subscriber gateway device;
converting, with the subscriber gateway device, the electrical signals into MAC layer signals representing the information packets; and
distributing, with the subscriber gateway device, the MAC layer signals to one or more subscriber devices coupled to the subscriber gateway device.

15. The method of claim 14, wherein
receiving the optical signals comprises receiving the optical signals from the optical network with an optical physical layer (PHY) component;
converting the optical signals to electrical signals comprises converting the optical signals to drive signals with a media converter; and
sending the electrical signals comprises transmitting the electrical signals to the subscriber gateway device in accordance with the drive signals using an electrical physical layer (PHY) component.

16. The method of claim 15, further comprising housing the optical PHY component, the media converter and the electrical PHY component within a pluggable optical module that is removably plugged into a socket of ONT.

17. The method of claim 14, further comprising selectively configuring the subscriber gateway device to support a plurality of optical network protocols.

18. The method of claim 17, wherein selectively configuring the subscriber gateway device comprises selectively configuring the subscriber gateway device to support two or more of a broadband passive optical network (BPON), a gigabit-capable passive optical network (GPON), a gigabit-capable Ethernet passive optical network (GEPON) and an active Ethernet optical network.

19. The method of claim 17, wherein selectively configuring the subscriber gateway device comprises selectively configuring the subscriber gateway device to support at least one active optical network protocol and at least one passive optical network protocol.

20. The method of claim 14, wherein the subscriber gateway device includes at least one of a switch, a wireless router, and an integrated access device to distribute the MAC layer signals to the one or more subscriber devices coupled to the subscriber gateway device.

21. The method of claim 14, further comprising:
extracting, with the subscriber gateway device, the information packets from the MAC layer signals; and
distributing, with the subscriber gateway device, the information packets to the one or more subscriber devices.

22. The method of claim 14, wherein the ONT is located outside a subscriber premises and the subscriber gateway device is located inside the subscriber premises, and wherein the cable penetrates at least one wall between the outside and the inside of the subscriber premises.

23. The method of claim 14, wherein the at least one cable comprises a single cable that includes a plurality of conductors including the at least one pair of electrical conductors and other conductors, the method further comprising sending operating power from an uninterruptible power supply (UPS) to ONT via at least one of the other conductors of the single cable.

24. The method of claim 14, wherein the at least one cable comprises a single cable that includes a plurality of conductors including the at least one pair of electrical conductors and other conductors, the method further comprising further comprising:
converting, with the ONT, optical signals representing radio frequency (RF) video to electrical signals;
converting the electrical signals to RF video signals; and
sending the RF video signals from the ONT to an RF video distribution unit via at least one coaxial conductor included in the single cable.

25. An optical network terminal (ONT) connected to a passive optical network (PON) via an optical fiber link, the ONT comprising:
an optical physical layer (PHY) component that receives optical signals representing information packets from the optical network;
a media converter that converts the optical signals to drive signals; and
an electrical physical layer (PHY) component that transmits electrical signals to a subscriber gateway device coupled to the ONT via at least one pair of electrical conductors included in at least one cable in accordance with the drive signals, wherein the electrical signals comprise raw bits, and wherein the ONT transmits the electrical signals to the subscriber gateway device without performing any media access control (MAC) layer functions with the ONT, including without converting the electrical signals into distinct data units and without providing addressing and channel access control mechanisms for transmission of the electrical signals to the subscriber gateway device.

26. The ONT of claim 25, wherein the optical PHY component, the media converter and the electrical PHY component are housed within a pluggable optical module that is removably plugged into a socket of ONT.

27. The ONT of claim 25, wherein the at least one cable comprises a single cable that includes a plurality of conductors including the at least one pair of electrical conductors and other conductors, the ONT further comprising a power source that receives operating power from an uninterruptible power supply (UPS) via at least one of the other conductors of the single cable.

28. The ONT of claim 25, wherein the at least one cable comprises a single cable that includes a plurality of conductors including the at least one pair of electrical conductors and other conductors, and the ONT converts optical signals representing radio frequency (RF) video to electrical signals, converts the electrical signals to RF video signals and transmits the RF video signals to an RF video distribution unit via at least one coaxial conductor included in the single cable.

29. A method comprising:
receiving, with an optical network terminal (ONT) that is connected to a passive optical network (PON) via an optical fiber link, optical signals representing information packets via the optical fiber link;
converting, with the ONT, the optical signals to electrical signals, wherein the electrical signals comprise raw bits; and
sending, with the ONT, the electrical signals to a subscriber gateway device coupled to the ONT via at least one pair of electrical conductors included in at least one cable without performing any media access control (MAC) layer functions with the ONT, including without converting the electrical signals into distinct data units and without providing addressing and channel access control mechanisms for transmission of the electrical signals to the subscriber gateway device.

30. The method of claim 29, wherein receiving the optical signals comprises receiving the optical signals from the optical network with an optical physical layer (PHY) component;
converting the optical signals to electrical signals comprises converting the optical signals to drive signals with a media converter; and
sending the electrical signals to the subscriber gateway device comprises transmitting the electrical signals to the subscriber gateway device in accordance with the drive signals using an electrical physical layer (PHY) component.

31. The method of claim 30, further comprising housing the optical PHY component, the media converter and the electrical PHY component within a pluggable optical module that is removably plugged into a socket of ONT.

32. The method of claim 29, wherein the at least one cable comprises a single cable that includes a plurality of conductors including the at least one pair of electrical conductors and other conductors, the method further comprising receiving operating power from an uninterruptible power supply (UPS) via at least one of the other conductors of the single cable.

33. The method of claim 29, wherein the at least one cable comprises a single cable that includes a plurality of conductors including the at least one pair of electrical conductors and other conductors, the method further comprising:
converting, with the ONT, optical signals representing radio frequency (RF) video to electrical signals;
converting the electrical signals to RF video signals; and
sending, with the ONT, the RF video signals to an RF video distribution unit via at least one coaxial conductor included in the single cable.

34. An optical network terminal (ONT) connected to a passive optical network (PON) via an optical fiber link, the ONT comprising:
means for receiving optical signals representing information packets via the optical fiber link;
means for converting the optical signals to electrical signals, wherein the electrical signals comprise raw bits; and
means for sending the electrical signals to a subscriber gateway device coupled to the ONT via at least one pair of electrical conductors included in at least one cable, wherein the ONT sends the electrical signals to the subscriber gateway device without performing any media access control (MAC) layer functions with the ONT, including without converting the electrical signals into distinct data units and without providing addressing and channel access control mechanisms for transmission of the electrical signals to the subscriber gateway device.

35. The ONT of claim 34, wherein
the receiving means comprises an optical physical layer (PHY) component;
the converting means comprises a media converter that converts the optical signals to drive signals; and
the sending means an electrical physical layer (PHY) component that transmits the electrical signals to the subscriber gateway device in accordance with the drive signals.

36. The ONT of claim 35, further comprising means for housing the optical PHY component, the media converter and the electrical PHY component within a pluggable optical module that is removably plugged into a socket of ONT.

37. The ONT of claim 34, wherein the at least one cable comprises a single cable that includes a plurality of conductors including the at least one pair of electrical conductors and other conductors, the ONT further comprising:
means for powering the ONT,
wherein the powering means receives operating power from an uninterruptible power supply (UPS) via at least one of the other conductors of the single cable.

38. The ONT of claim 34, wherein the at least one cable comprises a single cable that includes a plurality of conductors including the at least one pair of electrical conductors and other conductors, and:
the converting means converts optical signals representing radio frequency (RF) video to electrical signals, and converts the electrical signals to RF video signals; and
the sending means sends the RF video signals to an RF video distribution unit via at least one coaxial conductor included in the single cable.

39. A subscriber gateway device coupled to an optical network terminal (ONT) of a passive optical network (PON) via at least one cable, the subscriber gateway device comprising:
an optical media access control (MAC) unit that receives electrical signals from the ONT via at least one pair of electrical conductors included in the cable, and converts the electrical signals into MAC layer signals representing information packets, wherein the electrical signals comprise raw bits, and wherein the optical MAC unit receives the electrical signals without any MAC layer functions performed on the electrical signals by the ONT, including without converting the electrical signals into distinct data units and without providing addressing and channel access control mechanisms for transmission of the electrical signals to the subscriber gateway device; and
a gateway unit that distributes the MAC layer signals to one or more subscriber devices coupled to the subscriber gateway device.

40. The subscriber gateway device of claim 39, wherein the optical MAC unit of the subscriber gateway device is selectively configurable to support a plurality of optical network protocols.

41. The subscriber gateway device of claim 40, wherein the optical MAC unit is selectively configurable to support two or more of a broadband passive optical network (BPON), a gigabit-capable passive optical network (GPON), a gigabit-capable Ethernet passive optical network (GEPON) and an active Ethernet optical network.

42. The subscriber gateway device of claim 40, wherein the optical MAC unit is selectively configurable to support at least one active optical network protocol and at least one passive optical network protocol.

43. The subscriber gateway device of claim 39, wherein the gateway unit includes at least one of a switch, a wireless router, and an integrated access device to distribute the MAC layer signals to the one or more subscriber devices.

44. The subscriber gateway device of claim 39, wherein the gateway unit extracts the information packets from the MAC layer signals and distributes the information packets to the one or more subscriber devices.

45. The subscriber gateway device of claim 39, wherein the one or more subscriber devices include at least one of a telephone, television, computer, set-top box, wireless access point, powerline modem and router.

46. A method comprising:
   receiving, with a subscriber gateway device, electrical signals from an optical network terminal (ONT) of a passive optical network (PON) via at least one pair of electrical conductors included in at least one cable, wherein the electrical signals comprise raw bits, and wherein the electrical signals are received without any media access control (MAC) layer functions performed on the electrical signals by the ONT, including without converting the electrical signals into distinct data units and without providing addressing and channel access control mechanisms for transmission of the electrical signals to the subscriber gateway device;
   converting, with the subscriber gateway device, the electrical signals into MAC layer signals representing information packets; and
   distributing, with the subscriber gateway device, the MAC layer signals to one or more subscriber devices coupled to the subscriber gateway device.

47. The method of claim 46, further comprising selectively configuring the subscriber gateway device to support a plurality of optical network protocols.

48. The method of claim 47, wherein selectively configuring the subscriber gateway device comprises selectively configuring the subscriber gateway device to support two or more of a broadband passive optical network (BPON), a gigabit-capable passive optical network (GPON), a gigabit-capable Ethernet passive optical network (GEPON) and an active Ethernet optical network.

49. The method of claim 47, wherein selectively configuring the subscriber gateway device comprises selectively configuring the subscriber gateway device to support at least one active optical network protocol and at least one passive optical network protocol.

50. The method of claim 46, wherein the subscriber gateway device includes at least one of a switch, a wireless router, and an integrated access device to distribute the MAC layer signals to the one or more subscriber devices.

51. The method of claim 46, further comprising:
   extracting, with the subscriber gateway device, the information packets from the MAC layer signals; and
   distributing, with the subscriber gateway device, the information packets to the one or more subscriber devices.

52. A subscriber gateway device coupled to an optical network terminal (ONT) of a passive optical network (PON) via at least one cable, the subscriber gateway device comprising:
   means for receiving electrical signals from the ONT via at least one pair of electrical conductors included in the at least one cable, wherein the electrical signals comprise raw bits, and wherein the electrical signals are received without any media access control (MAC) layer functions performed on the electrical signals by the ONT, including without converting the electrical signals into distinct data units and without providing addressing and channel access control mechanisms for transmission of the electrical signals to the subscriber gateway device;
   means for converting the electrical signals into MAC layer signals representing information packets; and
   means for distributing the MAC layer signals to one or more subscriber devices coupled to the subscriber gateway device.

53. The subscriber gateway device of claim 52, further comprising means for selectively configuring the subscriber gateway device to support a plurality of optical network protocols.

54. The subscriber gateway device of claim 53, wherein the configuring means selectively configure the subscriber gateway device to support two or more of a broadband passive optical network (BPON), a gigabit-capable passive optical network (GPON), a gigabit-capable Ethernet passive optical network (GEPON) and an active Ethernet optical network.

55. The subscriber gateway device of claim 53, wherein the configuring means selectively configure the subscriber gateway device to support at least one active optical network protocol and at least one passive optical network protocol.

56. The subscriber gateway device of claim 52, wherein the distributing means includes at least one of a switch, a wireless router, and an integrated access device to distribute the MAC layer signals to the one or more subscriber devices.

57. The subscriber gateway device of claim 52, further comprising:
   means for extracting the information packets from the MAC layer signals; and
   means for distributing the information packets to the one or more subscriber devices.

* * * * *